(12) United States Patent
Jo et al.

(10) Patent No.: US 11,847,282 B2
(45) Date of Patent: Dec. 19, 2023

(54) ELECTRONIC DEVICE COMPRISING PEN INPUT DEVICE AND CONFIGURED TO REDUCE DETERIORATION IN ANTENNA DUE TO PEN INPUT DEVICE

(71) Applicant: Samsung Electronics Co., Ltd., Suwon-si (KR)

(72) Inventors: Jaehoon Jo, Suwon-si (KR); Dongyeon Kim, Suwon-si (KR); Hosaeng Kim, Suwon-si (KR); Seongjin Park, Suwon-si (KR); Chaejun Lee, Suwon-si (KR); Woomin Jang, Suwon-si (KR); Myunghun Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/990,116

(22) Filed: Nov. 18, 2022

(65) Prior Publication Data

US 2023/0079493 A1 Mar. 16, 2023

Related U.S. Application Data

(63) Continuation of application No. PCT/KR2021/004102, filed on Apr. 2, 2021.

(30) Foreign Application Priority Data

May 19, 2020 (KR) .................. 10-2020-0059650

(51) Int. Cl.
*G06F 3/044* (2006.01)
*G06F 3/041* (2006.01)
(Continued)

(52) U.S. Cl.
CPC .......... *G06F 3/0442* (2019.05); *G06F 3/0383* (2013.01); *G06F 3/03545* (2013.01);
(Continued)

(58) Field of Classification Search
CPC ................ G06F 1/1626; G06F 1/1698; G06F 2200/1632; G06F 2203/0384;
(Continued)

(56) References Cited

U.S. PATENT DOCUMENTS 6,262,684 B1 7/2001 Stewart et al.
9,035,921 B2 5/2015 Laurienzo et al.
(Continued)

FOREIGN PATENT DOCUMENTS

CN 102215652 B 5/2014
CN 106610696 A 5/2017
(Continued)

OTHER PUBLICATIONS

European Search Report dated Sep. 14, 2023, issued in European Application No. 21809540.4.

*Primary Examiner* — Chun-Nan Lin
(74) *Attorney, Agent, or Firm* — Jefferson IP Law, LLP

(57) ABSTRACT

An electronic device is provided. The electronic device includes a housing comprising a conductive part, and a first nonconductive part connected to the conductive part, an antenna structure positioned inside the housing, and a pen input device attachable/detachable to/from the housing, wherein the pen input device comprises a second nonconductive part having at least a portion thereof overlapping the first nonconductive part when viewed in a direction in which a main beam of the antenna structure is radiated while the pen input device is attached to the housing, and at least a portion of the at least one antenna element overlaps the first nonconductive part and the second nonconductive part.

18 Claims, 31 Drawing Sheets

(51) Int. Cl.
*G06F 3/0354* (2013.01)
*G06F 3/038* (2013.01)
*H01Q 1/22* (2006.01)
*H01Q 21/08* (2006.01)
*H01Q 9/04* (2006.01)

(52) U.S. Cl.
CPC .......... *G06F 3/04162* (2019.05); *H01Q 1/22* (2013.01); *H01Q 21/08* (2013.01); *G06F 2203/0384* (2013.01); *G06F 2203/04105* (2013.01); *H01Q 9/0414* (2013.01)

(58) Field of Classification Search
CPC ......... G06F 2203/04105; G06F 3/0354; G06F 3/03545; G06F 3/038; G06F 3/0383; G06F 3/04162; G06F 3/044; G06F 3/0442; H01Q 1/22; H01Q 21/08; H01Q 9/0414; H01Q 23/00
See application file for complete search history.

(56) References Cited

U.S. PATENT DOCUMENTS

| | | | |
|---|---|---|---|
| 9,766,727 B2 | 9/2017 | Jiang et al. | |
| 10,367,250 B2 | 7/2019 | Chen et al. | |
| 10,411,327 B2 | 9/2019 | Kim et al. | |
| 10,714,810 B2 | 7/2020 | Hong et al. | |
| 10,879,585 B2 | 12/2020 | Shin et al. | |
| 10,990,200 B2 | 4/2021 | Park et al. | |
| 11,349,205 B2 | 5/2022 | Kim et al. | |
| 2003/0063045 A1* | 4/2003 | Fleming | G06F 3/03545 345/30 |
| 2007/0025805 A1* | 2/2007 | Lapstun | G06F 3/0321 401/195 |
| 2014/0134962 A1 | 5/2014 | Huynh et al. | |
| 2015/0116291 A1* | 4/2015 | Leung | G06F 3/0383 345/179 |
| 2017/0097698 A1 | 4/2017 | Maeshima | |
| 2017/0117623 A1 | 4/2017 | Chan et al. | |
| 2017/0201011 A1* | 7/2017 | Khripkov | H01Q 1/42 |
| 2017/0324135 A1* | 11/2017 | Blech | H01Q 1/38 |
| 2018/0248254 A1* | 8/2018 | Islam | H01Q 19/13 |
| 2019/0288392 A1 | 9/2019 | Kim et al. | |
| 2020/0161766 A1* | 5/2020 | Liu | H01Q 9/045 |
| 2021/0111934 A1* | 4/2021 | Roberts | H04L 27/38 |
| 2021/0373679 A1* | 12/2021 | Shin | G06F 3/03545 |

FOREIGN PATENT DOCUMENTS

| | | |
|---|---|---|
| JP | 3206773 U | 10/2016 |
| KR | 10-1341844 B1 | 12/2013 |
| KR | 10-2016-0047234 A | 5/2016 |
| KR | 10-2016-0105102 A | 9/2016 |
| KR | 10-2017-0048723 A | 5/2017 |
| KR | 10-2018-0050820 A | 5/2018 |
| KR | 10-2018-0053201 A | 5/2018 |
| KR | 10-2019-0118095 A | 10/2019 |
| KR | 10-2020-0039959 A | 4/2020 |

\* cited by examiner

ELECTRONIC DEVICE COMPRISING PEN INPUT DEVICE AND CONFIGURED TO REDUCE DETERIORATION IN ANTENNA DUE TO PEN INPUT DEVICE

CROSS-REFERENCE TO RELATED APPLICATION(S)

This application is a continuation application, claiming priority under § 365(c), of an International application No. PCT/KR2021/004102, filed on Apr. 2, 2021, which is based on and claims the benefit of a Korean patent application number 10-2020-0059650, filed on May 19, 2020, in the Korean Intellectual Property Office, the disclosure of which is incorporated by reference herein in its entirety.

BACKGROUND

1. Field

The disclosure relates to an electronic device that includes a pen input device.

2. Description of Related Art

With the establishment of a "paperless" environment that considers the environment and is able to change work methods more efficiently, the use of smart devices is increasing, and with the rapid change to the mobile era, electronic devices may include pen input devices (e.g., a stylus pen). The input devices, which were previously required only for a specific purpose, are expanding the roles thereof as a new tool as the input devices become more sophisticated and are provided with many functions.

The above information is presented as background information only to assist with an understanding of the disclosure. No determination has been made, and no assertion is made, as to whether any of the above might be applicable as prior art with regard to the disclosure.

SUMMARY

A pen input device may be detachably attached to an electronic device such as a smartphone. A pen input device attached to an electronic device may have an electromagnetic effect on an antenna device. For example, when an antenna device transmits or receives a high-frequency signal such as millimeter wave, the pen input device attached to the electronic device may make it difficult to secure radiation performance due to the high-frequency characteristics having high linearity and sensitivity to path loss.

Aspects of the disclosure are to address at least the above-mentioned problems and/or disadvantages and to provide at least the advantages described below. Accordingly, an aspect of the disclosure is to provide an electronic device including a pen input device configured to reduce deterioration in antenna radiation performance due to the pen input device.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a conductive portion and a first non-conductive portion connected to the conductive portion, an antenna structure located inside the housing, and a pen input device detachable from the housing. The antenna structure includes a printed circuit board including a first surface and a second surface facing away from the first surface, and at least one antenna element located on the first surface or inside the printed circuit board to be closer to the first surface than the second surface. The pen input device includes a second non-conductive portion at least partially overlapping the first non-conductive portion when viewed in a direction in which a main beam of the antenna structure is radiated while the pen input device is attached to the housing, and at least a portion of the at least one antenna element may overlap the first non-conductive portion and the second non-conductive portion.

Various embodiments of the disclosure may secure antenna radiation performance by reducing the effect of a pen input device attached to an electronic device, such as a smartphone, on an antenna. Various embodiments of the disclosure may make it possible for the pen input device attached to the electronic device to be electromagnetically coupled to an antenna to change or extend coverage.

In addition, effects that may be obtained or predicted by various embodiments of the disclosure will be directly or implicitly disclosed in the detailed description of the embodiments of the disclosure. For example, various effects predicted according to various embodiments of the disclosure will be disclosed in the following detailed description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
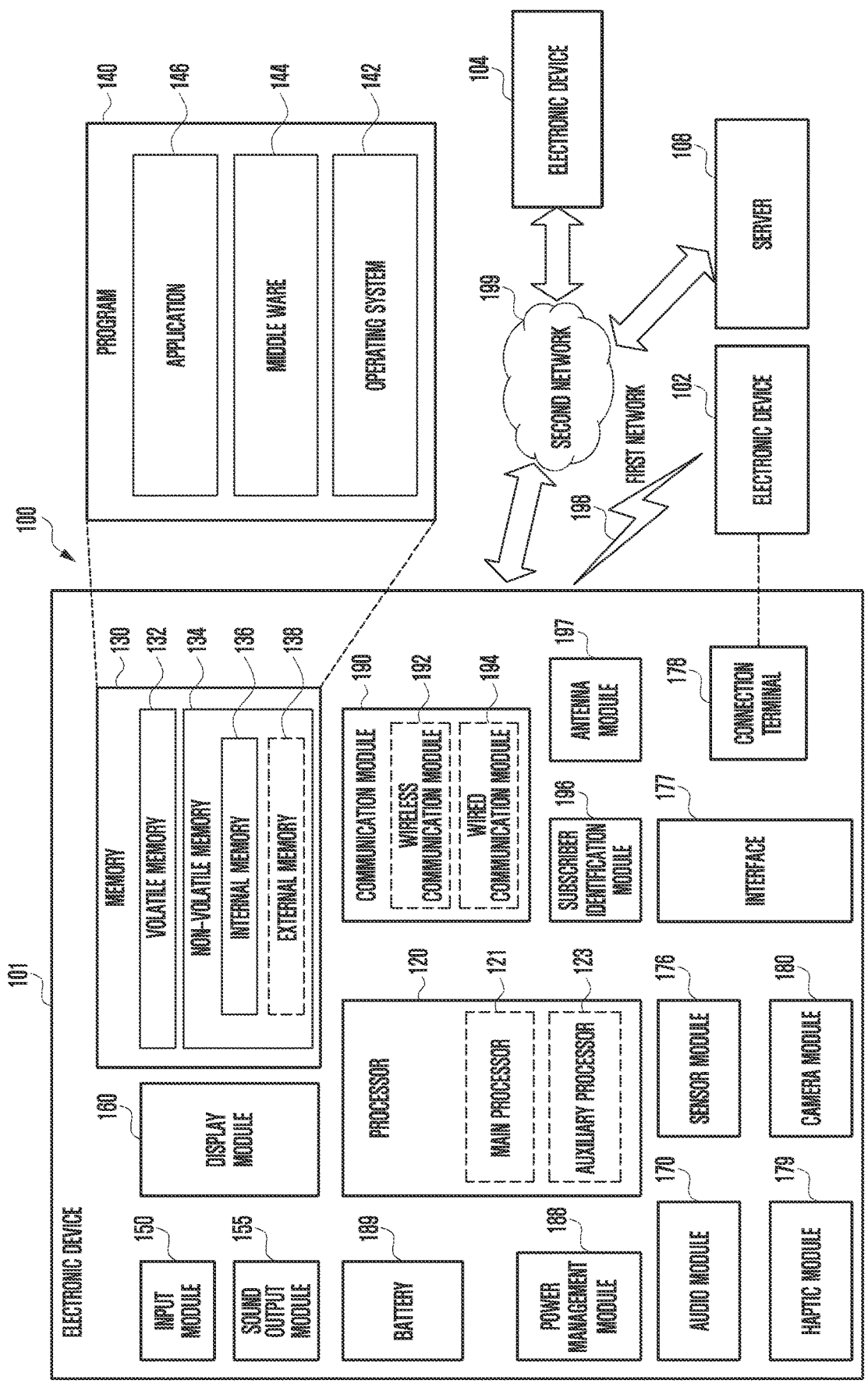
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store, for example, various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal or vice versa. According to an embodiment of the disclosure, the audio module 170 may obtain the sound via the input device 150, or output the sound via the sound output device 155 or an external electronic device (e.g., an electronic device 102) (e.g., a speaker or a headphone) directly or wirelessly coupled with the electronic device 101.

The sensor module 176 may detect an operational state (e.g., power or temperature) of the electronic device 101 or an external environmental state (e.g., a state of a user), and then generate an electrical signal or data value corresponding to the detected state. According to an embodiment of the disclosure, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the disclosure, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of a power management integrated circuit (PMIC).

The battery 189 may supply power to at least one component of the electronic device 101. According to an embodiment of the disclosure, the battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to some embodiments of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
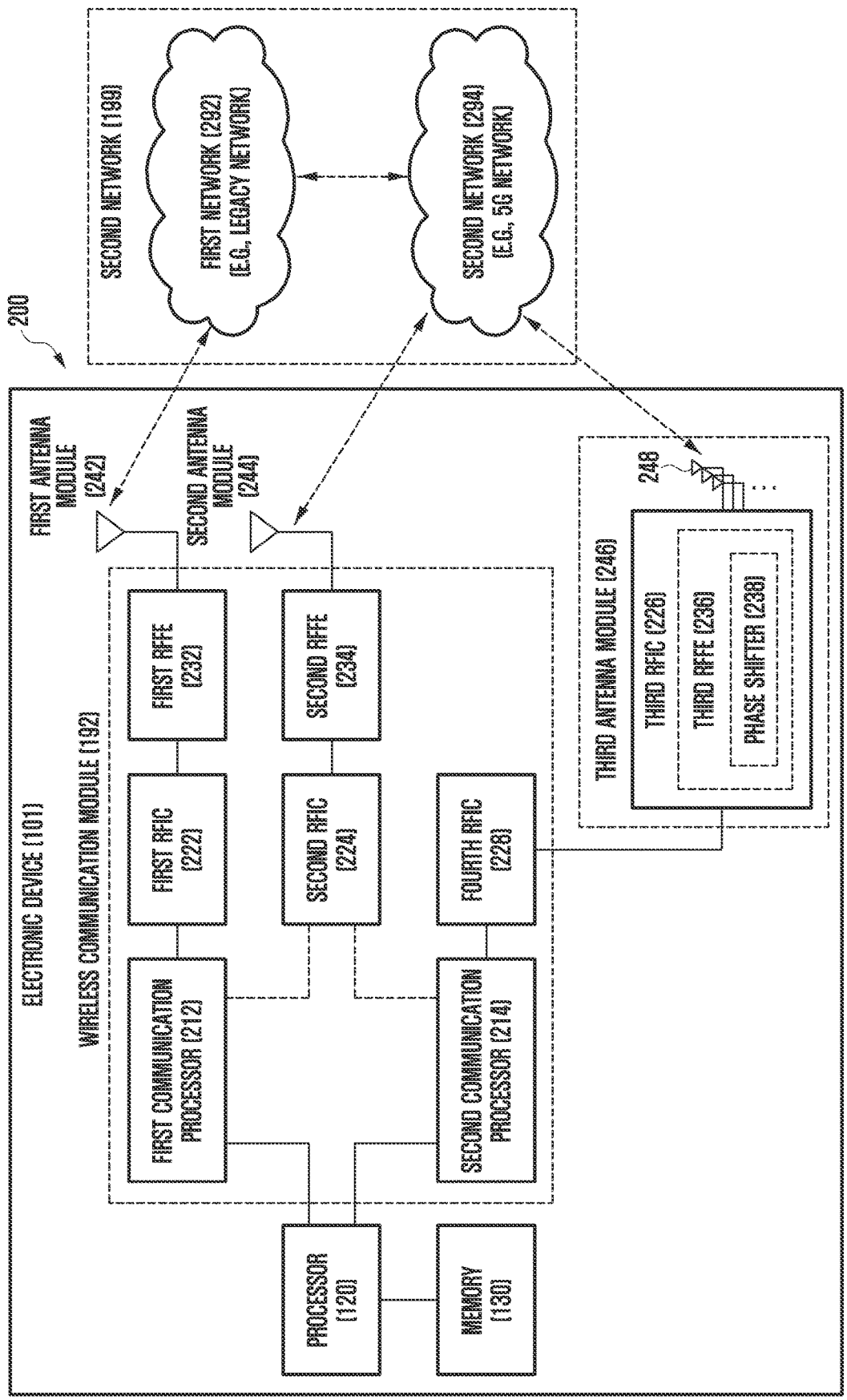
FIG. 2 is a block diagram of an electronic device configured to support legacy network communication and fifth generation (5G) network communication according to an embodiment of the disclosure.

FIG. 2 is a block diagram 200 illustrating an electronic device 101 for supporting legacy network communication and 5G network communication to according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, or antenna 248. The electronic device 101 may include a processor 120 and a memory 130. A network 199 may include a first network 292 and a second network 294. According to another embodiment of the disclosure, the electronic device 101 may further include at least one of the components described with reference to FIG. 1, and the network 199 may further include at least one other network. According to an embodiment of the disclosure, the first communication processor 212, second communication processor 214, first RFIC 222, second RFIC 224, fourth RFIC 228, first RFFE 232, and second RFFE 234 may form at least part of the wireless communication module 192. According to another embodiment of the disclosure, the fourth RFIC 228 may be omitted or included as part of the third RFIC 226.

The first communication processor 212 may establish a communication channel of a band to be used for wireless communication with the first network 292 and support legacy network communication through the established communication channel According to various embodiments of the disclosure, the first cellular network may be a legacy network including a second generation (2G), third generation (3G), fourth generation (4G), or long-term evolution (LTE) network. The second communication processor 214 may establish a communication channel corresponding to a designated band (e.g., about 6 gigahertz (GHz) to about 60 GHz) of bands to be used for wireless communication with the second network 294, and support 5G network communication through the established communication channel According to various embodiments of the disclosure, the second network 294 may be a 5G network defined in third generation partnership project (3GPP). Additionally, according to an embodiment of the disclosure, the first communication processor 212 or the second communication processor 214 may establish a communication channel corresponding to another designated band (e.g., about 6 GHz or less) of bands to be used for wireless communication with the second network 294 and support 5G network communication through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first network 292 (e.g., legacy network). Upon reception, an RF signal may be obtained from the first network 292 (e.g., legacy network) through an antenna (e.g., the first antenna module 242) and be preprocessed through an RFFE (e.g., the first RFFE 232).

The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second network 294 (e.g., 5G network). Upon reception, a 5G Sub6 RF signal may be obtained from the second network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above 6 RF signal) of a 5G Above 6 band (e.g., about 6 GHz to about 60 GHz) to be used in the second network 294 (e.g., 5G network). Upon reception, a 5G Above 6 RF signal may be obtained from the second network 294 (e.g., 5G network) through an antenna (e.g., the antenna 248) and be preprocessed through the third RFFE 236. The third RFIC 226 may convert the preprocessed 5G Above 6 RF signal to a baseband signal so as to be processed by the second communication processor 214. According to an embodiment of the disclosure, the third RFFE 236 may be formed as part of the third RFIC 226.

According to an embodiment of the disclosure, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment of the disclosure, the first RFIC 222 and the second RFIC 224 may be implemented into at least part of a single package or a single chip. According to an embodiment of the disclosure, the first RFFE 232 and the second RFFE 234 may be implemented into at least part of a single package or a single chip. According to an embodiment of the disclosure, at least one of the first antenna module 242 or the second antenna module 244 may be omitted or may be combined with another antenna module to process RF signals of a corresponding plurality of bands.

According to an embodiment of the disclosure, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second network 294 (e.g., 5G network).

According to an embodiment of the disclosure, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above 6 RF signal to be transmitted to the outside (e.g., a base station of a 5G network) of the electronic device 101 through a corresponding antenna element. Upon reception, each of the plurality of phase shifters 238 may convert a phase of the 5G Above 6 RF signal received from the outside to the same phase or substantially the same phase through a corresponding antenna element. This enables transmission or reception through beamforming between the electronic device 101 and the outside.

The second network 294 (e.g., 5G network) may operate (e.g., stand-alone (SA)) independently of the first network 292 (e.g., legacy network) or may be operated (e.g., non-stand-alone (NSA)) in connection with the first network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
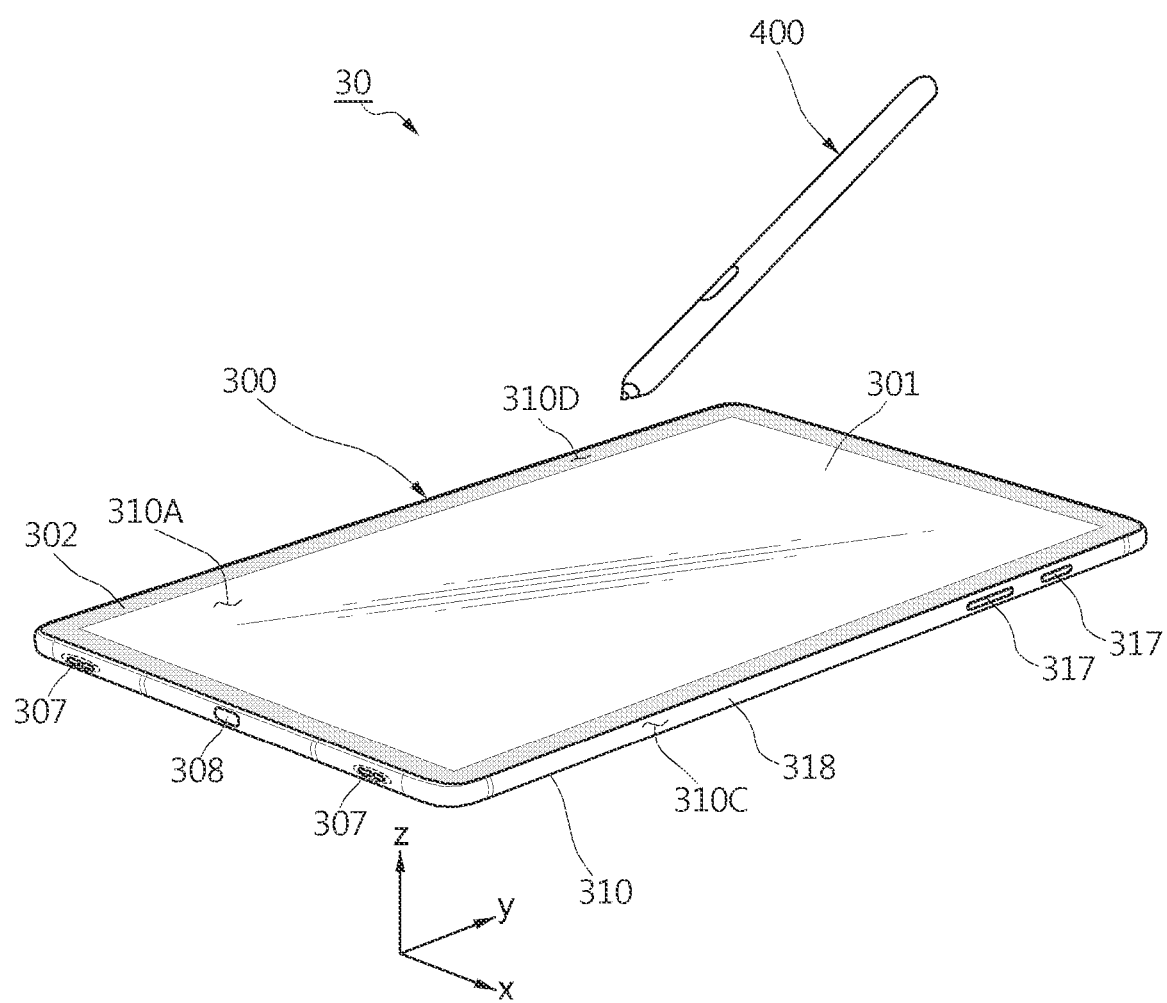
FIGS. 3 and 4 are perspective views of the electronic device according to various embodiments of the disclosure.
Figure 4:
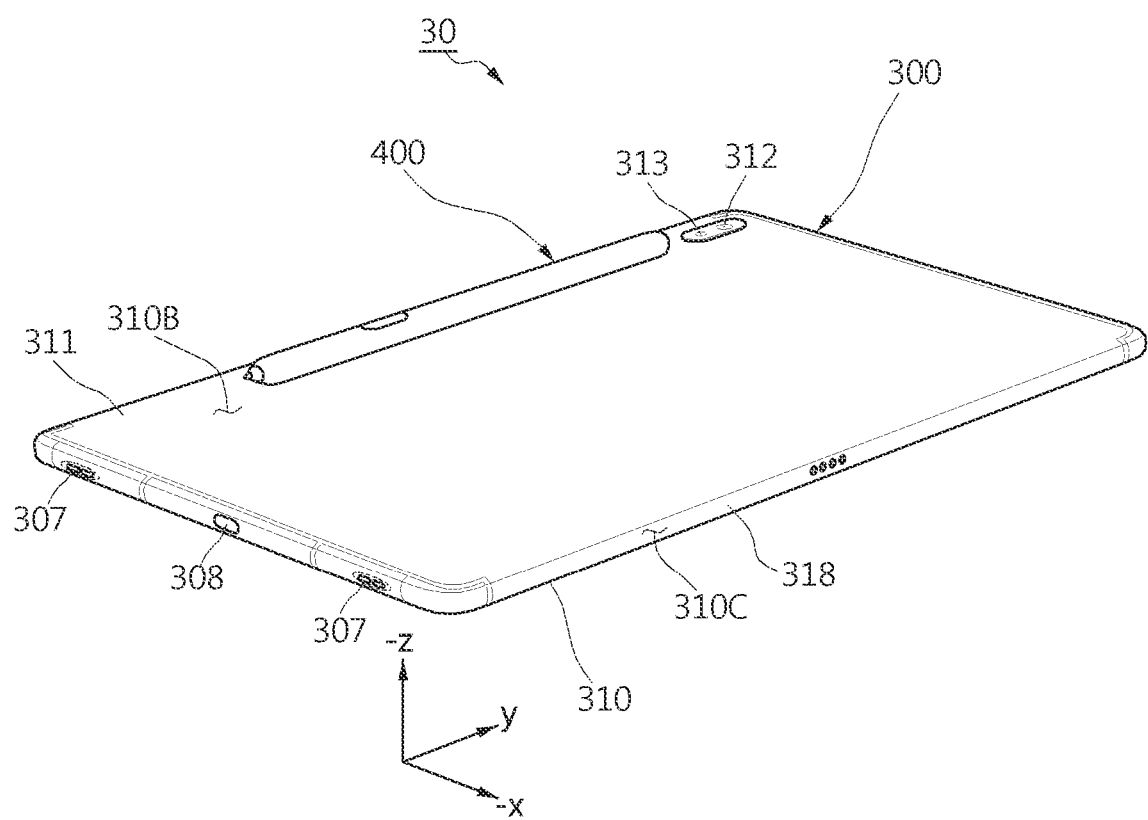

FIGS. 3 and 4 are perspective views of an electronic device 30 according to various embodiments of the disclosure.

Referring to FIGS. 3 and 4, the electronic device 30 may include a host device 300 and a pen input device 400 configured to be detachably attached to the host device 300. The electronic device 30 may be the electronic device 101 of FIG. 1.

The host device 300 may include, for example, a first housing 310 that forms an external appearance thereof. According to an embodiment of the disclosure, the first housing 310 may include a front surface 310A, a rear surface 310B, and a lateral surface 310C surrounding the space between the front surface 310A and the rear surface 310B. According to another embodiment of the disclosure (not illustrated), the first housing 310 may refer to a structure that forms at least part of the front surface 310A, the rear surface 310B, and the lateral surface 310C. At least a portion of the front surface 310A may be formed of a substantially transparent front plate 302 (e.g., a glass plate or a polymer plate including various coating layers). The rear surface 310B may be formed of a substantially opaque rear plate 311. The rear plate 311 may be made of, for example, coated or colored glass, ceramic, polymer, or metal (e.g., aluminum, stainless steel (STS), or magnesium), or a combination of two or more of these materials. The lateral surface 310C may be configured by a side bezel structure (or a "lateral member") 318 coupled to the front plate 302 and the rear plate 311 and including a metal and/or a polymer. In some embodiments, the rear plate 311 and the side bezel structure 318 may be integrally configured, and may include the same material (e.g., a metal material such as aluminum).

The host device 300 may include a display 301, an audio module, a sensor module, camera modules 312 and 313, key input devices 317, or a connector hole 308. According to embodiments of the disclosure, in the host device 300, one or more of the components (e.g., the key input devices 317) may be omitted, or other components may be additionally included.

The display 301 may be visually exposed through, for example, the front plate 302. The display 301 may be visually exposed through a substantial portion of the front plate 302. As an example (not illustrated), the edges of the display 301 may be configured to be substantially the same as the shape of the periphery of the front plate 302 adjacent thereto. As another example (not illustrated), the distance between the periphery of the display 301 and the periphery of the front plate 302 may be substantially constant in order to increase the exposed area of the display 301.

According to another embodiment of the disclosure (not illustrated), a recess or opening is formed in a portion of a screen display area (e.g., an active area) of the display 301, and an audio module (e.g., a speaker), a sensor module (e.g., a proximity sensor or a biometric sensor), or a camera module may be aligned to and located in the recess or the opening. In another embodiment (not shown), an audio module, a sensor module, or a camera module may be located adjacent to the rear surface of the screen display area of the display 301. In another embodiment (not illustrated), the display 301 may be coupled to or disposed adjacent to a touch-sensitive circuit, a pressure sensor capable of measuring a touch intensity (pressure), and/or a digitizer configured to detect a magnetic field-type pen input device 400.

The audio module may include a microphone hole (not illustrated) and/or speaker holes 307. The microphone hole may include a microphone disposed therein so as to acquire external sound. In some embodiments, multiple microphones may be disposed so as to detect the direction of sound. The audio module may include a receiver hole for a call. The speaker holes 307 and the microphone hole may be implemented as a single hole, or a speaker may be included without the speaker holes 307 (e.g., a piezo speaker).

The sensor module may generate an electrical signals or data value corresponding to the internal operating states or the external environmental states of the host device 300. As an example (not illustrated), the sensor module may include a proximity sensor configured to generate a signal regarding the proximity of an external object based on light passing through a partial area of the front surface 310A of the first housing 310. In another example (not illustrated), the sensor module may include various biometric sensors such as a fingerprint sensor and an HRM sensor for detecting biometric information based on light passing through a partial area of the front surface 310A or the rear surface 310B. The host device 300 may include at least one of various other sensor modules, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 312 and 313 may include, for example, a camera device 312 and/or a flash 313. The camera device 312 and the flash 313 may be disposed in the second surface 310B of the first housing 310. The camera device 312 may include one or more lenses, an image sensor, and/or an image signal processor. The flash 313 may include, for example, a light-emitting diode or a xenon lamp. Two or more lenses (e.g., an infrared camera lens, a wide-angle lens, and a telephoto lens) and image sensors may be disposed in one surface of the host device 300. The camera modules may further include a camera device (not illustrated) configured to generate an image signal based on light passing through a partial area of the front surface 310A of the first housing 310.

The key input devices 317 may be disposed in the lateral surface 310C of the first housing 310. According to another embodiment of the disclosure, the above-mentioned key input devices 317 may be omitted, and the omitted key input devices 317 may be implemented in another form, such as soft keys, on the display 301. A key input device may include a sensor module (not illustrated) disposed in the rear surface 310B of the first housing 310.

The connector hole 308 may be located corresponding to a connector (e.g., a USB connector) configured to transmit/receive power and/or data to/from an external electronic device. The connector may transmit/receive an audio signal to/from an external device.

The pen input device 400 (e.g., a stylus pen) may be detachably attached to the first housing 310 of the host device 300. For example, the pen input device 400 may be detachably attached to the rear surface 310B of the first housing 310. The rear surface 310B may include a pen attachment area (not illustrated) to which the pen input device 400 is attachable. The pen attachment area may be provided to be visually distinguishable from the rear surface 310B.

The pen input device 400 may be implemented in an electromagnetic induction type (e.g., an electro-magnetic resonance (EMR) type). The pen input device 400 may include a resonance circuit, and the resonance circuit may be interlocked with an electromagnetic induction panel disposed inside the first housing 310.

The pen input device 400 may be implemented in an active electrical stylus (AES) type or an electric coupled resonance (ECR) type.

The pen input device 400 may be attached to the host device 300 by using a magnetic body. For example, the pen input device 400 may be attached to the host device 300 due to an attractive force between a magnetic body included in the pen input device 400 and a magnetic body included in the host device 300. The pen input device 400 may be attached to the host device 300 in various other types. As an example (not illustrated), a type in which the pen input device 400 into the first housing 310 may be provided.

Without being limited to the type in which the pen input device 400 is detachably attached to the rear surface 310B, a type in which the pen input device 400 is detachably attached to the front surface 310A or the lateral surface 310C may be implemented. For example, in the type in which the pen input device 400 is detachably attached to the front surface 310A, the bezel area 310D may be used as the pen attachment area. The bezel area 310D is a portion of the front surface 310A in which the display 301 is not expanded, and may have, for example, a shape surrounding the display 301 when viewed from above the front surface 310A.

Figure 5:
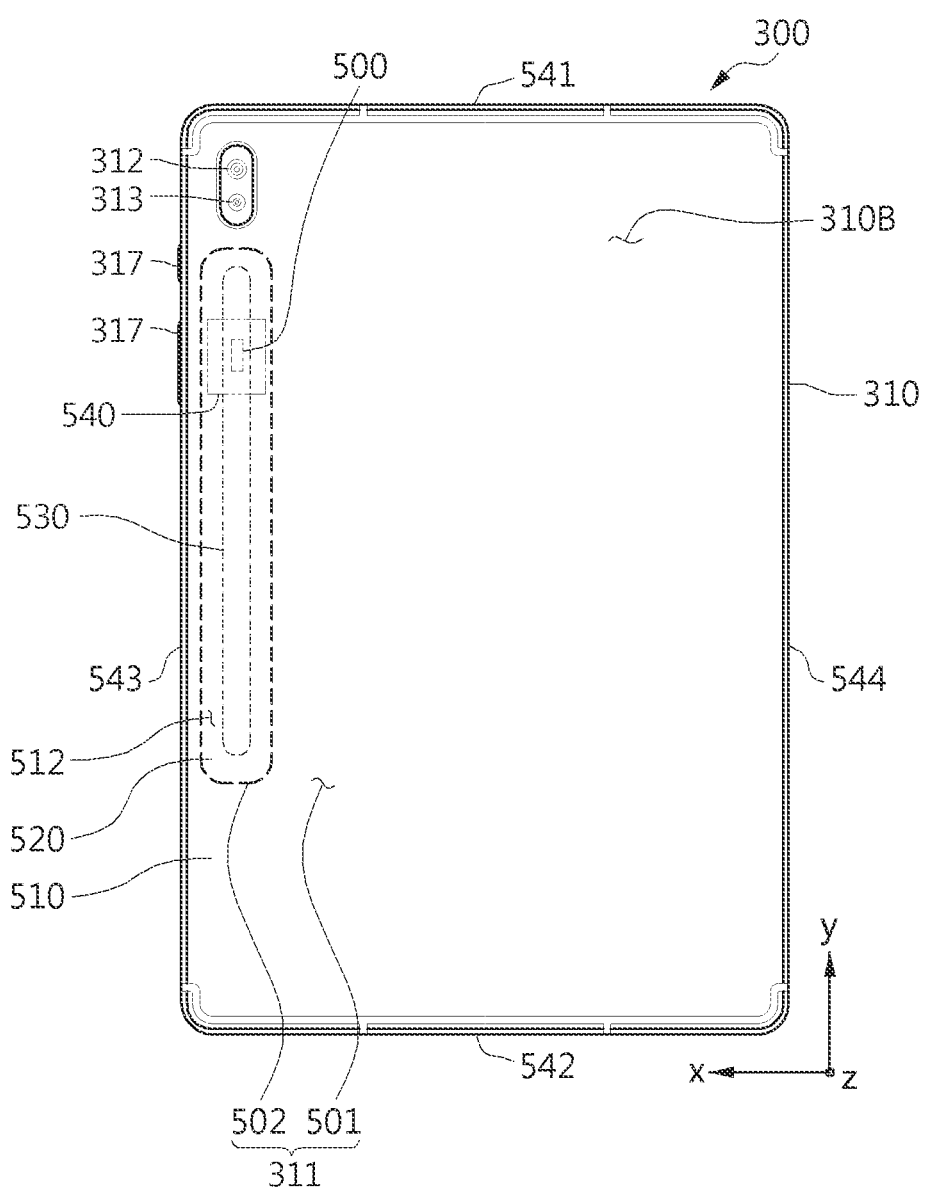
FIG. 5 is a plan view of a host device according to an embodiment of the disclosure.
Figure 6:
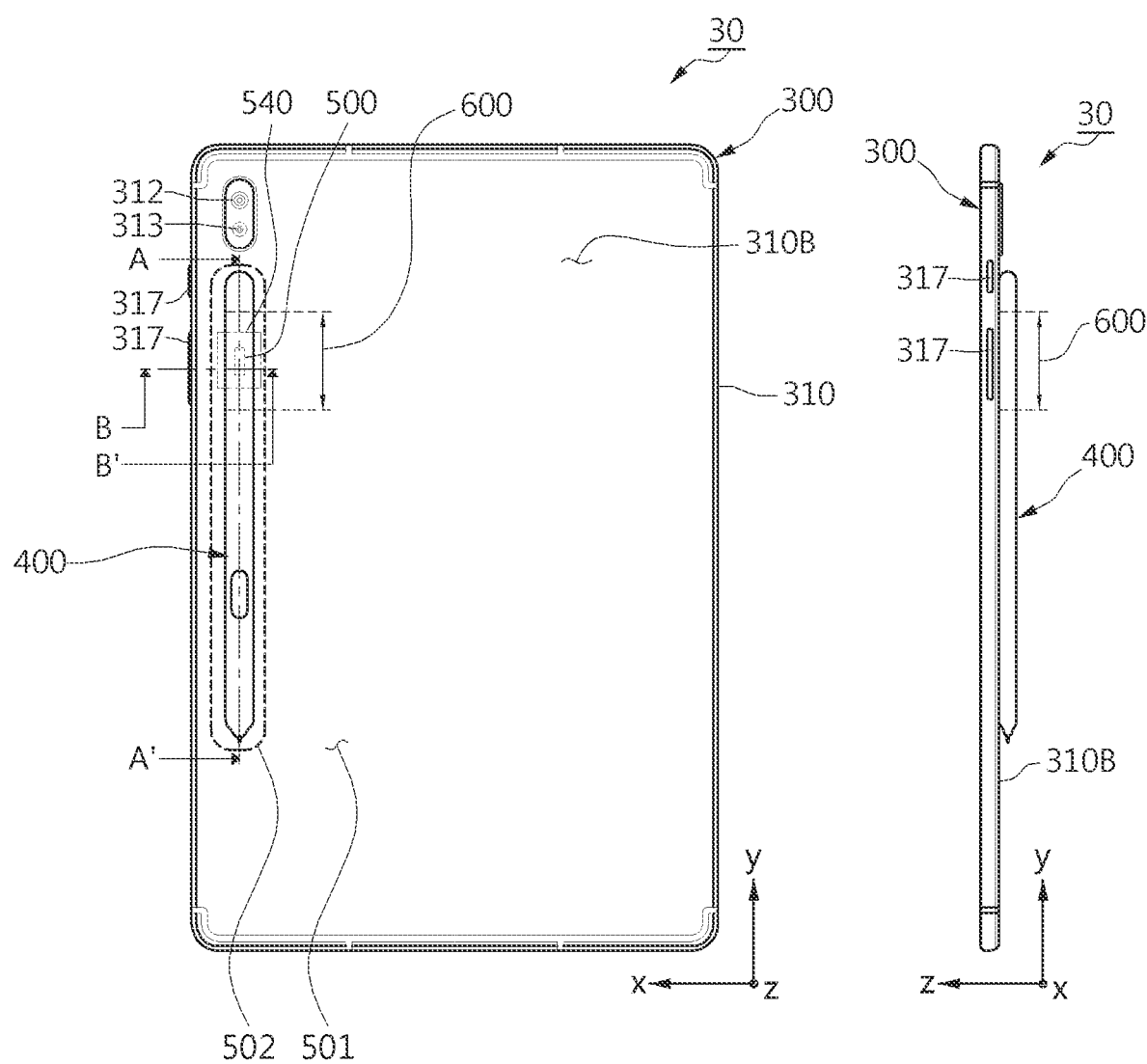
FIG. 6 is a plan view of an electronic device in a state in which a pen input device is attached to a host device according to an embodiment of the disclosure.

FIG. 5 is a plan view of the host device 300 according to an embodiment of the disclosure. FIG. 6 is a plan view of the electronic device 30 in the state in which the pen input device 400 is attached to the host device 300 according to an embodiment of the disclosure.

A redundant description of some of the reference numerals of FIG. 5 or FIG. 6 will be omitted.

Referring to FIGS. 5 and 6, the rear plate 311 may include a first area 501 and a second area 502. The second area 502 may include an area to which the pen input device 400 is attached, and the first area 501 may include an area of the rear plate 311 except for the second area 502. The second area 502 may be at least partially covered by the pen input device 400 when viewed from above the rear surface 310B while the pen input device 400 is attached to the second area 502. The first area 501 may not overlap the pen input device 400 when viewed from above the rear surface 310B in the state in which the pen input apparatus 400 is attached to the second area 502. The second area 502 may include an opening 512 provided in the rear plate 311. For example, the second area 502 may be a non-conductive area 520 in which a non-conductive material is filled in an opening 512.

The second area 502 may include a first non-conductive portion (or a first non-conductive area) 540. For example, at least a portion of the first non-conductive portion 540 may be formed of a non-conductive material (e.g., a polymer). As another example, an area excluding the first non-conductive portion 540 in the second area 502 may be formed of a conductive material (e.g., aluminum, stainless steel (STS), or magnesium). In another example, the second area 502 may be formed of a non-conductive material. The first non-conductive portion 540 may be a radio frequency window area. The first non-conductive portion 540 may overlap at least a portion of the antenna module 500 disposed in the inner space of the host device 300 when viewed from above the rear plate 311. For example, the first non-conductive portion 540 may overlap at least a portion of the antenna array included in the antenna module 500 when viewed from above the rear plate 311. When the antenna module 500 transmits or receives a frequency signal, radio waves related to the frequency signal may pass through the first non-conductive portion 540. The first non-conductive portion 540 may secure coverage while reducing deterioration in radiation performance of the antenna module 500 by the rear plate 311. The first area 501 may include a conductive material (e.g., aluminum, stainless steel (STS), or magnesium) or a non-conductive material. For example, the first area 501 may include a conductive area 510.

At least a portion of the area 520 in which the opening 512 provided in the second area 502 is filled with a non-conductive material may include the first non-conductive portion 540. The opening 512 provided in the second area 502 is not limited to the embodiment of FIG. 5, and may be implemented in various other shapes or sizes. The opening 512 provided in the second area 502 may be implemented in a shape corresponding to the first non-conductive portion 540. According to various embodiments of the disclosure, the shape of the first area 501 and/or the second area 502 may vary without being limited to the embodiment of FIG. 5 or FIG. 6.

The first housing 310 may include a first lateral surface 541 and a second lateral surface 542 located opposite to each other, and a third lateral surface 543 and a fourth lateral surface 544 located opposite to each other. For example, the first lateral surface 541 and the second lateral surface 542 may be substantially parallel to each other, and the third lateral surface 543 and the fourth lateral surface 544 may be substantially parallel to each other. The first lateral surface 541 or the second lateral surface 542 may be perpendicular to the third lateral surface 543 or the fourth lateral surface 544. The second area 502 may have, for example, a shape elongated in a direction from the first lateral surface 541 toward the second lateral surface 542 (e.g., the −y-axis direction) according to the shape of the pen input device 400. In another example, the second area 502 may be located closer to the first lateral surface 543 than the second lateral surface 544. Referring to FIG. 6, when the pen input device 400 is attached to the second area 502, the first non-conductive portion 540 (e.g., the RF window area) may be at least partially covered by the pen input device 400.

The first non-conductive portion 540 (e.g., the RF window area) of the second area 502 may at least partially overlap the antenna module 500 (e.g., the third antenna module 246 in FIG. 2) located inside the first housing 310 when viewed from above the rear surface 310B. The antenna module 500 may have directivity capable of concentrating radio waves in a specific direction or transmitting/receiving waves. The antenna module 500 may include an antenna array including a plurality of antenna elements. By a beam-forming system, the antenna module 500 may form a beam pattern (or an antenna radiation pattern) in which beams (or lobes) formed from the plurality of antenna elements of the antenna array are combined. The beam pattern is an effective area in which the antenna array is capable of radiating or detecting radio waves, and may be formed by combining radiated powers of the plurality of antenna elements of the antenna array. The beam pattern may include a main beam (or a main lobe) in a maximum radiation direction (boresight). For example, the main beam refers to a beam from which a relatively large amount of energy is radiated, and the antenna module 500 may substantially transmit and/or receive a frequency signal through the main beam. The antenna module 500 may form a main beam in a direction toward the rear surface 310B (e.g., the −z-axis direction in FIG. 4). The main beam of the antenna module 500 may be directed to the first non-conductive portion 540 included in the second area 502, and the first non-conductive portion 540 may reduce the effect of the rear plate 311 on the main beam. When viewed in a direction in which the main beam of the antenna module 500 is radiated, the antenna array of the antenna module 500 may at least partially overlap the first non-conductive portion 540. For example, when the conductive portion of the rear plate 311 replaces the first non-conductive portion 540 and overlaps the antenna module 500, the conductive portion may cause deformation or distortion of the beam pattern or may block or obstruct the propagation of radio waves from the antenna module 500. The first non-conductive portion 540 may reduce the effect of the rear plate 311 on the radio waves radiated from the antenna module 500 to reduce the deformation or distortion of the beam pattern or to make it possible to secure coverage (communication range).

The radiation performance of the antenna module 500 may not be substantially affected by the first non-conductive portion 540. In some cases, the radiation performance of the antenna module 500 may be within a critical range of the performance security level although it may be affected by the first non-conductive portion 540. As the permittivity of the first non-conductive portion 540 is lower, the effect of the first non-conductive portion 540 on the radiation performance of the antenna module 500 may be reduced, and in consideration of this, the first non-conductive portion 540 may be formed of various materials. For example, the first non-conductive portion 540 may include a polymer material.

When the permittivity of the first non-conductive portion 540 makes it difficult to secure the radiation performance of the antenna module 500, in order to secure the radiation performance, tuning based on various parameters such as the shape (e.g., the width or thickness) of the first non-conductive portion 540 or the separation distance between first non-conductive portion 540 and the antenna module 500 (e.g., thickness of an air gap) may be performed. For example, when it is difficult to secure the radiation performance of the antenna module 500, the thickness of the first non-conductive portion 540 may be reduced.

The non-conductive area 520 of the second area 502 may be connected to the conductive area 510 of the first area 501. The non-conductive area 520 may be filled in the opening 512 of the second area 502 to improve aesthetics and may prevent foreign substances such as water or dust from entering through the opening 512. The surface of the non-conductive area 520 and the surface of the conductive area 510 may be smoothly connected to each other to form the rear surface 310B. Although not illustrated, the non-conductive area 520 may further include a portion extending into the first housing 310 and coupled to the rear plate 311. The conductive area 510 of the first area 501 may be replaced with a non-conductive material which is different from the material of the non-conductive area 520 of the second area 502.

In the second area 502, the pen attachment area 530 to which the pen input device 400 is attached may be visually distinguished from the surrounding area while being provided to be elongated in accordance with the shape of the pen input device 400, thereby improving a user experience with respect to the pen attachment area 530 provided for the pen input device 400.

According to an embodiment of the disclosure, the pen attachment area 530 may be provided visually on the rear surface 310B in various ways such as printing. According to another embodiment of the disclosure, the pen attachment area 530 may be provided in the form of a recess so that the pen input device 400 is disposed therein. The pen attachment area 530 may include a non-conductive material, and at least a portion of the pen attachment area 530 may be included in the first non-conductive portion 540 (e.g., an RF window area).

While the pen input device 400 is attached to the pen attachment area 530, a partial section of the pen input device 400 is a non-conductive section that does not include a conductive material and may overlap the first non-conductive portion 540 when viewed from above the rear surface 310B. For example, the pen input device 400 may include a second non-conductive portion (or a second non-conductive area) 600 forming the non-conductive section. When viewed from above the rear surface 310B while the pen input device 400 is attached to the pen attachment area 530, the plurality of antenna elements of the antenna module 500 may overlap the first non-conductive portion 540 of the rear plate 311 and the second non-conductive portion 600 of the pen input device 400. While the pen input device 400 is attached to the pen attachment area 530, the first non-conductive portion 540 and the second non-conductive portion 600 may be located to overlap each other in a direction in which a main beam of the antenna module 500 is radiated. When viewed in the direction in which the main beam of the antenna module 500 is radiated while the pen input device 400 is attached to the pen attachment area 530, the plurality of antenna elements of the antenna module 500 may overlap at least a portion of the first non-conductive portion 540 and at least a portion of the second non-conductive portion 600.

The second non-conductive portion 600 may be disposed in a direction in which the main beam of the antenna module 500 is radiated, thereby reducing the effect of the pen input device 400 on a signal radiated from the antenna module 500. For example, when the second non-conductive portion 600 is replaced and a conductive material is included in the replacement portion, the conductive material may cause deformation or distortion of the beam pattern or may block or obstruct the propagation of a signal radiated from the antenna module 500. The second non-conductive portion 600 disposed in the direction in which the main beam of the antenna module 500 is radiated may reduce the effect of the pen input device 400 on the radio waves radiated from the antenna module 500 to make it possible to reduce the deformation or distortion of the beam pattern or to secure coverage (communication range).

According to an embodiment of the disclosure, the radiation performance of the antenna module 500 may not be substantially affected by the second non-conductive portion 600. In some cases, the radiation performance of the antenna module 500 may be within a critical range of the performance security level although it may be affected by the second non-conductive portion 600. As the permittivity of the second non-conductive portion 600 is lower, the effect of the second non-conductive portion 600 on the radiation performance of the antenna module 500 may be reduced, and in consideration of this, the second non-conductive portion 600 may be formed of various materials.

When the permittivity of the second non-conductive portion 600 makes it difficult to secure the radiation performance of the antenna module 500, in order to secure the radiation performance, tuning based on various parameters, such as the shape of at least a portion included in the second non-conductive portion 600 or the spatial positional relationship between the second non-conductive portion 600 and the antenna module 500, may be performed. The second non-conductive portion 600 provided through such tuning may make it possible to secure the radiation performance of the antenna module 500 in the state in which the pen input device 400 is attached to the host device 300.

Figure 7:
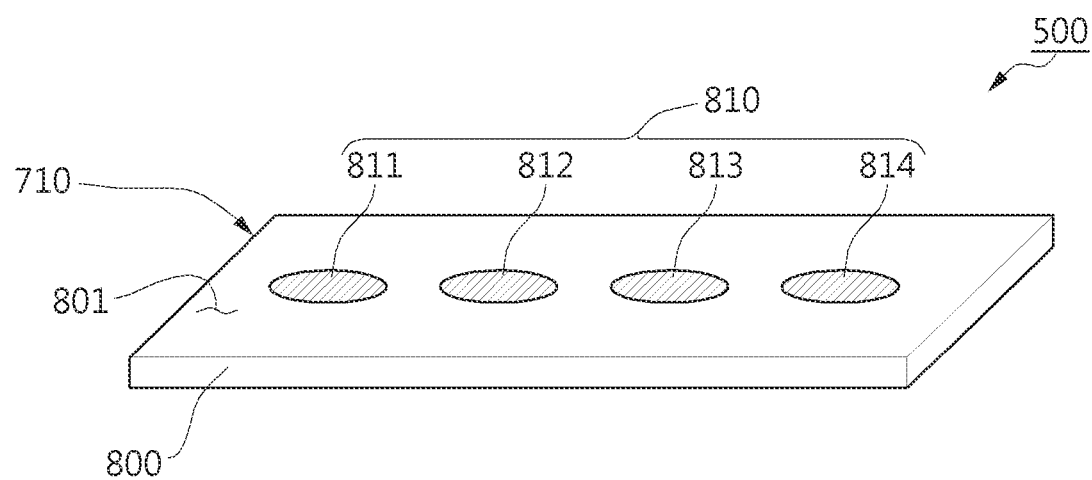
FIGS. 7 and 8 are perspective views of the antenna module of FIG. 6 according to various embodiments of the disclosure.
Figure 8:
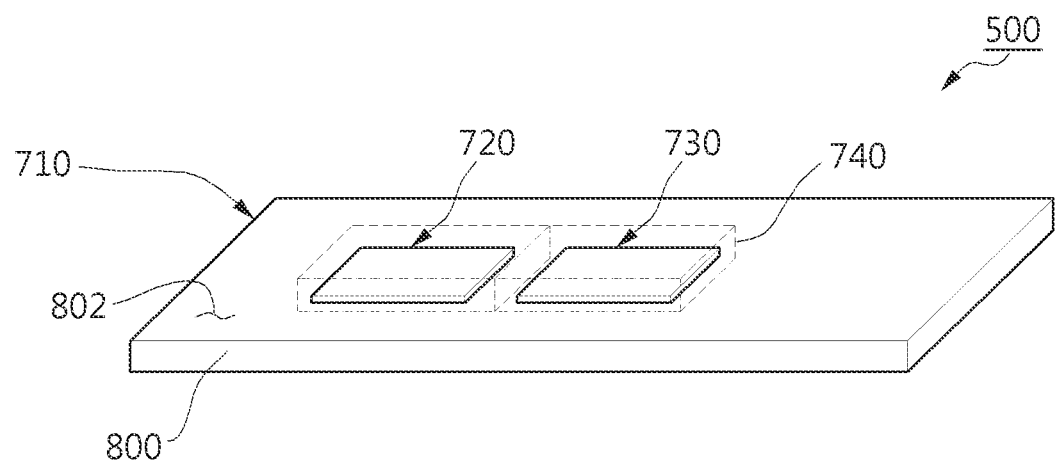

FIGS. 7 and 8 are perspective views of the antenna module 500 of FIG. 6 according to various embodiments of the disclosure.

Referring to FIGS. 7 and 8, the antenna module 350 may include an antenna structure 710, a second radio communication circuit 720, or a second power management circuit 730. The antenna module 500 may be, for example, the third antenna module 246 of FIG. 2.

The antenna structure 710 may include a second printed circuit board 800 on which the antenna array 810 is disposed. The second printed circuit board 800 may include a first surface 801 and a second surface 802 facing away from the first surface 801. The antenna array 810 includes a plurality of antenna elements 811, 812, 813, and 814, which are disposed on the first surface 801 or inside the second printed circuit board 800 to be closer to the first surface 801 than the second surface 802. The plurality of antenna elements 811, 812, 813, and 814 may be, for example, the antenna 248 of FIG. 2.

According to an embodiment of the disclosure, the plurality of antenna elements 811, 812, 813, and 814 may have substantially the same shape and may be disposed at regular intervals. As another example, the plurality of antenna elements 811, 812, 813, and 814 may transmit and/or receive signals of substantially the same frequency band. The second printed circuit board 800 may include a plurality of conductive layers (e.g., a plurality of conductive pattern layers) and a plurality of non-conductive layers (e.g., insulative layers) alternately stacked with the plurality of conductive layers. The plurality of antenna elements 811, 812, 813, and 814 may be implemented by, for example, at least two of the plurality of conductive layers. The number or positions of antenna elements included in the antenna array 810 may vary without being limited to the embodiment illustrated in FIG. 7.

The plurality of antenna elements 811, 812, 813, and 814 may operate as a patch antenna. The shapes of the plurality of antenna elements 811, 812, 813, and 814 may vary without being limited to the circular shape according to the embodiment of FIG. 7. For example, the plurality of antenna elements 811, 812, 813, and 814 may be formed in a square or oval shape. According to an embodiment of the disclosure (not shown), the antenna elements 811, 812, 813, and 814 may be disposed on different layers of the second printed circuit board 800 to implement a stacked structure including a plurality of conductive portions (e.g., conductive patches) which overlap each other. The antenna elements 811, 812, 813, and 814 may be disposed in a single-layer structure included in the second printed circuit board 800. The number or positions of antenna arrays may vary without being limited to the embodiment illustrated in FIG. 7. As an example (not illustrated), the antenna module 500 may further include an antenna array including a plurality of antenna elements operating as a dipole antenna. As another example, the plurality of antenna elements 811, 812, 813, and 814 may operate as an antenna other than a patch antenna or a dipole antenna.

The second radio communication circuit 720 may be disposed on the second surface 802 of the second printed circuit board 800 via a conductive bonding member such as solder. For example, the second radio communication circuit 720 may be electrically connected to the plurality of antenna elements 811, 812, 813, and 814 via wiring lines (e.g., electrical paths made of a conductive pattern or vias) included in the second printed circuit board 800. In another example, the second radio communication circuit 720 may be disposed on a printed circuit board other than the second printed circuit board 800. The second radio communication circuit 720 may be a radio frequency integrate circuit (RFIC) (e.g., the third RFIC 226 in FIG. 2).

According to an embodiment of the disclosure, the plurality of antenna elements 811, 812, 813, and 814 may be fed with power directly or indirectly from the second radio communication circuit 720 to operate as an antenna radiator.

According to another embodiment of the disclosure, the plurality of antenna elements 811, 812, 813, and 814 may be used as dummy elements (e.g., a dummy antenna, a dummy patch, or a conductive patch). The dummy elements may be physically separated from other conductive elements in an electrically floating state. The antenna module 500 may include a plurality of feed elements (not illustrated), which at least partially overlap the plurality of antenna elements 811, 812, 813, and 814 when viewed from above the first surface 801, and are physically separated from the plurality of antenna elements 811, 812, 813, and 814. The plurality of feed antenna elements may be electrically connected to the second radio communication circuit 720, and the plurality of antenna elements 811, 812, 813, and 814 may be fed with power indirectly from the plurality of feed antenna elements to operate as an antenna radiator.

The antenna structure 710 may include a ground plane (or a ground layer) (not illustrated) implemented with at least some of the plurality of conductive layers included in the second printed circuit board 800. The ground plane may be disposed between the antenna array 810 and the second surface 802, and may at least partially overlap the antenna array 810 when viewed from above the first surface 801. The antenna module 500 may further include an antenna array operating as a dipole antenna (not illustrated). For example, the ground plane included in the second printed circuit board 800 may not overlap the antenna array operating as a dipole antenna.

According to an embodiment of the disclosure, the second power management circuit 730 may be disposed on the second surface 802 of the second printed circuit board 800 via a conductive bonding member such as solder. According to another embodiment of the disclosure, the second power management circuit 730 may be disposed on a printed circuit board (e.g., the first printed circuit board 340 of FIG. 9) other than the second printed circuit board 800. The second power management circuit 730 may be electrically connected to the second radio communication circuit 720 or various other elements (e.g., connectors and passive elements) disposed on the second printed circuit board 800 via wiring lines (e.g., electrical paths constituted with a conductive pattern or vias) included in the second printed circuit board 800. According to an embodiment of the disclosure, the second power management circuit 730 may be a power management integrated circuit (PMIC).

The antenna module 500 may further include a shield member 740 disposed on the second surface 802 to surround at least one of the second radio communication circuit 720 and/or the second power management circuit 730. The shield member 740 may electromagnetically shield the second radio communication circuit 720 and/or the second power management circuit 730. For example, the shield member 740 may include a conductive member such as a shield can. As another example, the shield member 740 may include a protective member such as a urethane resin and a conductive paint such as an EMI paint applied to the outer surface of the protective member. The shield member 740 may be implemented with various shield sheets disposed to cover the second surface 802.

The antenna module 500 may further include a frequency adjustment circuit (not illustrated) disposed on the second printed circuit board 800. The frequency adjustment circuit such as a tuner or a passive element may shift an impedance matching or resonant frequency to a predetermined frequency or by a predetermined amount.

Referring to FIGS. 5 and 7, the first surface 801 of the second printed circuit board 800 may face the first non-conductive portion 540 of the rear plate 311. Referring to FIGS. 6 and 7 when viewed from above the rear plate 311, at least a portion of the first surface 801 of the second printed circuit board 800 may overlap the first non-conductive portion 540 of the rear plate 311 and the second non-conductive portion 600 of the pen input device 400. A main beam formed through the antenna array 810 may be radiated in a direction in which the first surface 801 is oriented. When the antenna module 500 transmits or receives a frequency signal, radio waves related to the frequency signal may travel through the first non-conductive portion 540 (e.g., an RF window area) and the second non-conductive portion 600 disposed to overlap each other in the direction in which the main beam is radiated.

Figure 9:
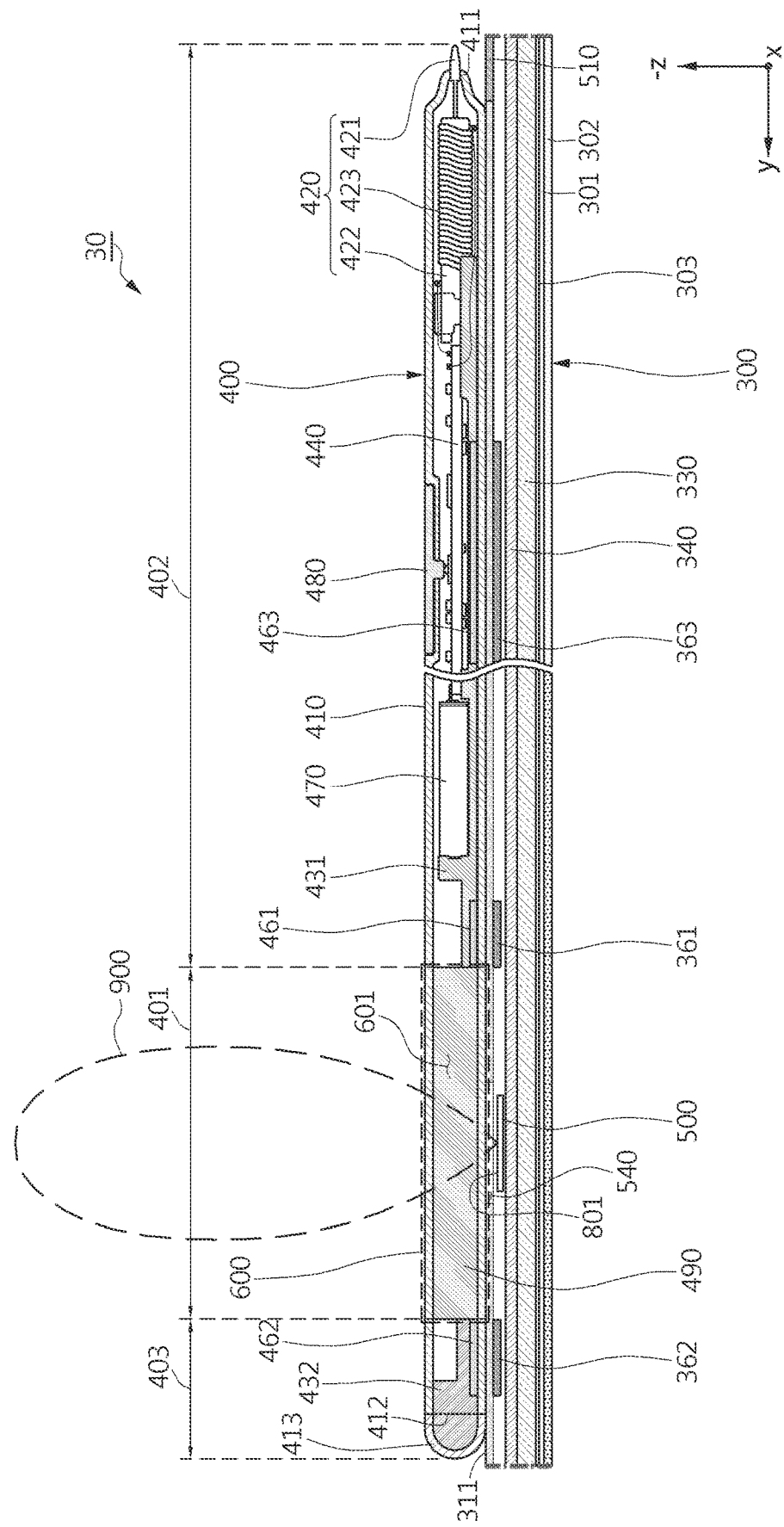
FIG. 9 is a cross-sectional view of the electronic device of FIG. 6 taken along line A-A' according to an embodiment of the disclosure.
Figure 10:
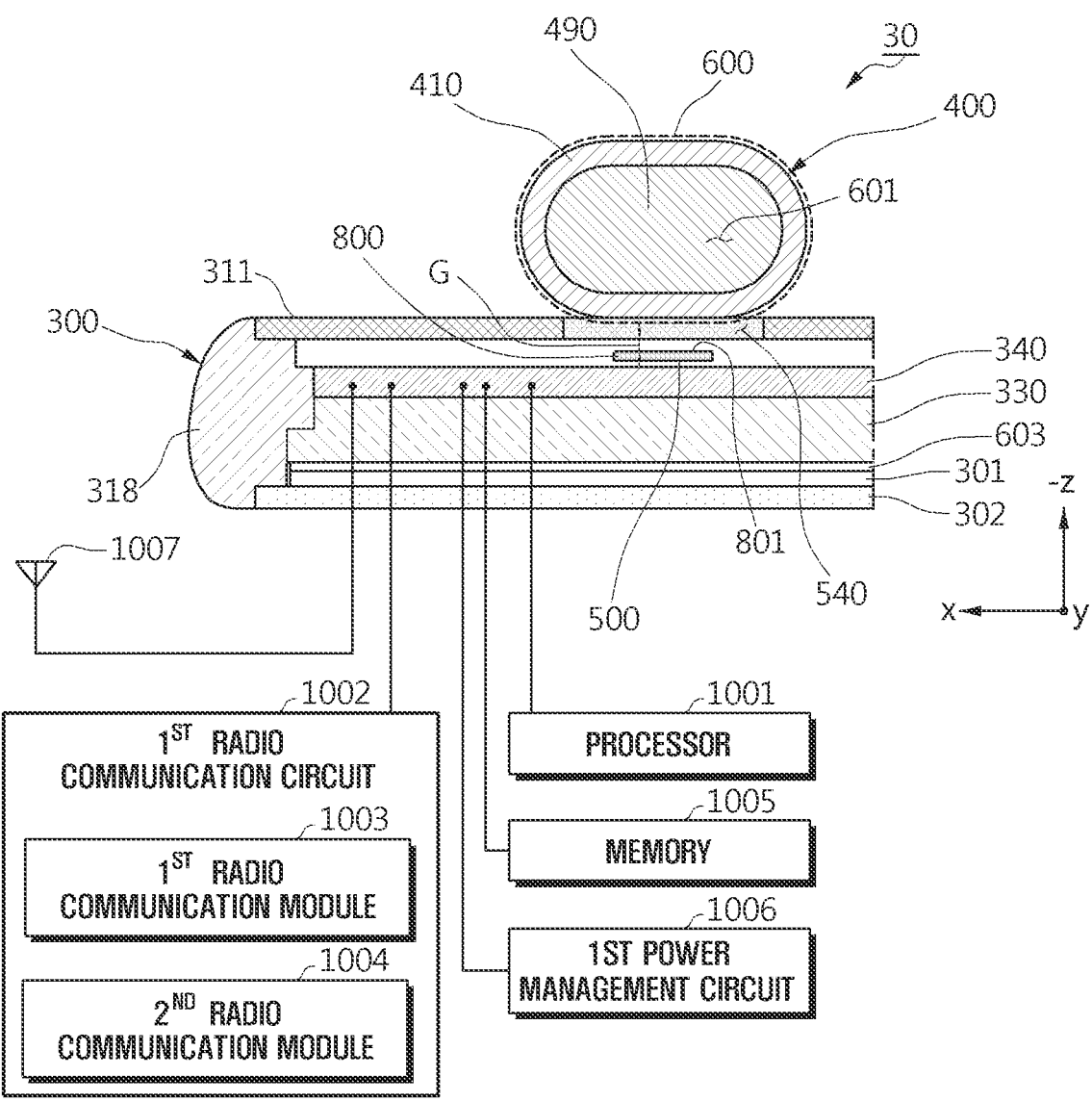
FIG. 10 is a cross-sectional view of the electronic device of FIG. 6 taken along line B-B' according to an embodiment of the disclosure.

FIG. 9 is a cross-sectional view of the electronic device 30 of FIG. 6 taken along line A-A' according to an embodiment of the disclosure. FIG. 10 is a cross-sectional of the electronic device 30 of FIG. 6 taken along line B-B' according to an embodiment of the disclosure.

Referring to FIGS. 9 and 10, the electronic device 30 may include a host device 300 and a pen input device 400. The host device 300 may include a front plate 302, a rear plate 311, a display 301, an electromagnetic induction panel 303, a support member 330, a first printed circuit board 340, an antenna module 500, a first magnetic body 361, a second magnetic body 362, or a third magnetic body 363. A redundant description of some of the reference numerals of FIG. 9 or FIG. 10 will be omitted.

The support member 330 may be located between the front plate 302 and the rear plate 311, and may be connected to the lateral member 318 or configured integrally with the lateral member 318. The support member 330 may be formed of, for example, a metal material and/or a non-metal material (e.g., polymer). The display 301 and the electromagnetic induction panel 303 may be disposed between the support member 330 and the front plate 302. The first printed circuit board 340 may be disposed between the support member 330 and the rear plate 311. Various elements may be disposed on the first printed circuit board 340, such as a processor, a memory, and/or an interface.

The electromagnetic induction panel 303 may be a panel for detecting an input of the pen input device 400 and may include, for example, a digitizer. For example, the electromagnetic induction panel 303 may include a printed circuit board (e.g., flexible printed circuit board (FPCB)) and/or a shield sheet. The shield sheet prevents interference between the components by electromagnetic fields generated from various components included in the host device 300, such as the display 301, the first printed circuit board 340, or the electromagnetic induction panel 303. By blocking the electromagnetic fields generated from the components, the shield sheet is capable of causing the input from the pen input device 400 to be accurately transferred to a coil included in the electromagnetic induction panel 303.

The antenna module 500 may be located between the first printed circuit board 340 and the rear plate 311. Although not illustrated, a support structure may be provided for coupling between the antenna module 500 and the first printed circuit board 340. The first surface 801 of the antenna module 500 may be disposed to face the rear plate 311. The second printed circuit board 800 (see FIG. 7) of the antenna module 500 may be substantially parallel to the first printed circuit board 340. The second printed circuit board 800 (e.g., see FIG. 7) of the antenna module 500 may be substantially parallel to the rear plate 311.

The pen input device 400 may be attached to the host device 300 due to an attractive force between a magnetic body included in the pen input device 400 and a magnetic body included in the host device 300. The first magnetic body 361, the second magnetic body 362, or the third magnetic body 363 of the host device 300 may be located in the space between the rear plate 311 and the support member 330. For example, the first magnetic body 361, the second magnetic body 362, or the third magnetic body 363 may be disposed on the rear plate 311. In another example, the first magnetic body 361, the second magnetic body 362, or the third magnetic body 363 may be disposed on a support structure (not illustrated) to be substantially located close to the rear plate 311.

The pen input device 400 may include a second housing 410, a pen tip sensor 420, holders 431 and 432, a third printed circuit board 440, a fourth magnetic body 461, a fifth magnetic body 462, a sixth magnetic body 463, a battery 470, or a button 480.

The second housing 410 may at least partially form the external appearance of the pen input device 400, and may include, for example, a tubular housing (not illustrated) in the form of a straight extension (hereinafter, the second housing 410 is also referred to as a "tubular housing"). For example, the tubular housing may be implemented in the form of a unibody including openings 411 and 412 on opposite sides. The second housing 410 may include a cover 413 that blocks one side opening 412 of the tubular housing. For example, the pen input device 400 may be manufactured through an operation of forming an assembly in which the pen tip sensor 420, the third printed circuit board 440, the fourth magnetic body 461, the fifth magnetic body 462, the sixth magnetic body 463, or the battery 470 is coupled to holders 431 and 432, an operation of disposing the assembly inside the tubular housing, and an operation of coupling the cover 413 to the tubular housing. The second housing 410 may be formed of various materials such as ceramic or polymer, and may be substantially rigid.

The pen tip sensor 420 may include, for example, a pen tip 421, and may serve as a pointer indicating a position (or coordinates) of the pen input device 400, and a pen pressure detector that detects a pressure or pressure sensitivity (e.g., the amount of force used to adjust the thickness of a line). One side of the second housing 410 may include an opening 411 and a shape tapered toward the opening 411. The pen tip 421 may protrude outward through the opening 411. When a user input is made with the pen input device 400 on the screen of the host device 300 (e.g., a device including the front plate 302, the display 301, and the electromagnetic induction panel 303), the pen tip sensor 420 may indicate a portion that generates a position signal and a pen pressure signal on the screen. The processor (e.g., the processor 120 in FIG. 1) may receive the position signal and the pen pressure signal generated by the pen tip sensor 420 via the screen to determine the position (coordinate) and pen pressure of the user input on the screen. The pen tip sensor 420 may generate an angle signal, and the processor may receive the angle signal from the pen tip sensor 420 via the screen to determine the angle of the pen input device 400 with respect to the screen. The pen tip sensor 420 may be implemented in various types capable of generating a signal related to the user input on the screen (e.g., a position signal, a pen pressure signal, and/or an angle signal).

When a user input is made on the screen of the host device 300 with the pen input device 400, the pen tip sensor 420 may be implemented to receive energy from the screen and generate the signal related to the user input on the screen (e.g., a position signal, a pen pressure signal, and/or an angle signal). The pen tip sensor 420 may operate in an electromagnetic induction type (e.g., an EMR type) and may include, for example, a core 422 (e.g., a magnetic body or ferrite) connected to the pen tip 421, and a coil 423 disposed in the core 422. When alternating current is supplied to the electromagnetic induction panel 303 of the host device 300, the electromagnetic induction panel 303 may form a magnetic field on the screen. When the pen tip sensor 420 is brought close to the screen, a current may flow in the coil 423 of the pen tip sensor 420 by electromagnetic induction. The signal related to the user input on the screen (e.g., a position signal, a pen pressure signal, and/or an angle signal) may be generated by the pen tip sensor 420 by using the energy supplied from the electromagnetic induction panel 303.

The pen tip sensor 420 may be implemented to generate electrostatic signals (e.g., a position signal, a pen pressure signal, and/or an angle signal) related to the user input on the screen by using the power of the battery 470. For example, the pen tip sensor 420 may generate an electrostatic signal related to a user input (e.g., a signal distinct from a user's hand or finger) by using the power of the battery 470 (e.g., an AES type). The pen tip sensor 420 may transmit or receive various communication signals such as an identification degree of the host device 300 via the screen. In an embodiment in which the pen tip sensor 420 generates an electrostatic signal by using the power of the battery 470, the electrostatic induction panel 303 of the host device 300 may be omitted. The pen tip sensor 420 may be implemented in various other types to generate a signal related to a user input on the screen (e.g., a position signal, a pen pressure signal, and/or an angle signal).

When a user input is made on the screen with the pen input device 400, the pen tip 421 may move in a direction toward the battery 470 to press a pen pressure switch (not illustrated). The pen input device 400 may generate a pen pressure signal based on a signal detected by the pen pressure switch. According to various embodiments of the disclosure, when a user input is made on the screen with the pen input device 400, a change in capacitance may occur, and a pen pressure signal may be generated based on the change in capacitance. The change in capacitance may occur when the pen tip 421 moves toward the battery 470.

The third printed circuit board 440 may be located between, for example, the pen tip sensor 420 and the battery 470, and may be electrically connected to the pen tip sensor 420 and the battery 470. Various components supporting the pen input device 420 to perform a charging function, a communication function, and/or a sensor function may be disposed on the third printed circuit board 440. For example, various sensor modules such as a radio communication module (e.g., a Bluetooth communication module) or a motion sensor may be disposed on the third printed circuit board 440. The pen tip sensor 420 may include a coil 423 that is implemented in an electromagnetic induction type and extends from one end to the other end, and one end and the other end of the coil 423 may be electrically connected to the third printed circuit board 440. A first communication controller (not illustrated) configured to perform first radio communication with the host device 300 via the pen tip sensor 420 may be disposed on the third printed circuit board 440. For example, when a user input is made on the screen of the host device 300 with the pen input device 400, the first communication controller may transmit a radio frequency signal related to a position signal, a pen pressure signal, and/or an angle to the screen of the host device 300 via the pen tip sensor 420.

When a user input is made on the screen of the host device 300 with the pen input device 400, the pen tip sensor 420 may receive a magnetic field emitted from the screen of the host device 300 to generate a current, and the first communication controller (e.g., an EMR communication controller) may generate and transmit a radio frequency signal related to the position signal, the pen pressure signal, and/or the angle signal to the screen of the host device 300 via the pen tip sensor 420 by using the generated current. According to another embodiment of the disclosure, when a user input is made on the screen of the host device 300 with the pen input device 400, the pen tip sensor 420 may generate a current by receiving a signal emitted from a touch-sensitive circuit (e.g., a touch screen panel (TSP)) of the display 301. The first communication controller may generate and transmit a transmission signal to the host device 300 via the pen tip sensor 420 to the host device 300 by using the generated current. The pen tip sensor 420 may be implemented to perform first radio communication in which the pen tip sensor 420 itself generates a current by receiving a signal emitted via the screen of the host device 300 and transmits a transmission signal (Tx signal) to the host device 300 by using the generated current. For example, the pen tip sensor 420 generates a current by using a signal emitted via the electromagnetic induction panel 303 or the touch-sensitive circuit of the display 301, and may transmit a transmission signal to the host device 300 by using the generated current.

A second communication controller (not illustrated) configured to perform second radio communication with the host device 300 via at least one antenna may be disposed on the third printed circuit board 440. The at least one antenna may be disposed at various positions of the pen input device 400, for example, disposed on the third printed circuit board 440 or disposed in the second housing 410. The second radio communication may include short-range communication such as Bluetooth low energy (BLE) communication, or near field communication (NFC). A signal from the motion sensor included in the pen input device 400 may be transmitted to the host device 300 through first radio communication or second radio communication.

The battery 470 may be located to be spaced apart from the pen tip sensor 420 with the third printed circuit board 440 interposed therebetween. The battery 470 may supply power to at least one component of the pen input device 400 and may include, for example, a rechargeable secondary battery. The pen input device 400 may include an active area related to a charging function, a communication function, or a sensor function, and the active area may be driven by using the power of the battery 470. The battery 470 may be electrically connected to the third printed circuit board 440 to supply power to the third printed circuit board 440.

The button 480 may be disposed in the second housing 410 and exposed to the outside. For example, when the button 480 is pressed by an external force, a signal may be generated in a push switch disposed on the third printed circuit board 440 due to the pressing by the button 480. The input device included in the pen input device 420 may be implemented in various other types. For example, the input device may be implemented based on various user input detection elements such as a pressure sensor, a touch sensor, or an ultrasonic sensor capable of detecting a user input. The button 480 may include a user input detection element based on a pressure sensor, a touch sensor, an optical sensor, a strain gauge, or a magnetic material.

A power management controller (not illustrated) may be disposed on the third printed circuit board 440. While the pen input device 400 is attached to the host device 300, the power management controller may wirelessly receive power (or a charging signal) from the host device 300 to charge the battery 470. While the pen input device 400 is attached to the host device 300, the power management controller may wirelessly receive a charging signal from the host device 300 via the pen tip sensor 420 to charge the battery 470. For example, when a magnetic field flowing through an antenna (e.g., a coil) of the host device 300 is applied to the coil 423 when the pen input device 400 is in the state of being attached to the host device 300, an induced current flows in the coil 423, and the power management controller may charge the battery 470 by using the induced current.

A fourth magnetic body 461, a fifth magnetic body 462, or a sixth magnetic body 463 may be located inside the second housing 410. For example, the fourth magnetic body 461 or the sixth magnetic body 463 may be disposed in the holder 431 and may be substantially located close to the inner surface of the second housing 410. For example, the fifth magnetic body 462 may be disposed in the holder 432 and may be substantially located close to the inner surface of the second housing 410. When the pen input device 400 is attached to the host device 300, the first magnetic body 361 and the fourth magnetic body 461 may be aligned so that an attractive force may be generated therebetween. When the pen input device 400 is attached to the host device 300, the second magnetic body 362 and the fifth magnetic body 462 may be aligned so that an attractive force may be generated therebetween. When the pen input device 400 is attached to the host device 300, the third magnetic body 363 and the sixth magnetic body 463 may be aligned so that an attractive force may be generated therebetween. Due to the attractive force between the aligned magnetic bodies, the pen input device 400 may be maintained in the state of being attached to the host device 300. The number or positions of magnetic bodies may vary without being limited to the embodiment of FIG. 9.

The first magnetic body 361 may be located between the second magnetic body 362 and the third magnetic body 363, and the distance between the first magnetic body 361 and the second magnetic body 362 may be different from the distance between the first magnetic body 361 and the third magnetic body 363. Such a distance difference may guide a user to a position to which the pen input device 400 is attached on the host device 300 or the direction of the pen input device 400.

In the host device 300, one magnetic body (e.g., the third magnetic body 363) may have a length (e.g., the length in the y-axis direction in FIG. 9) different from that of another magnetic body (e.g., the first magnetic body 361 or the second magnetic body 363). The magnetic body of the pen input device 400 may be formed to have substantially the same length as that of the corresponding magnetic body of the host device 300. The length difference between the magnetic bodies may guide the user to a position to which the pen input device 400 is attached on the host device 300 or the direction of the pen input device 400 based on the magnitude of the attractive force between the magnetic bodies.

The pen tip sensor 420, the third printed circuit board 440, the battery 470, the fourth magnetic body 461, the fifth magnetic body 462, and/or the sixth magnetic body 463 may be organically coupled via the holders 431 and 432. The holders 431 and 432 may contribute to rigidity capable of preventing deformation (e.g., distortion or bending) or damage of the pen input device 400 with respect to an external impact or external pressure caused by the fall of the pen input device 400 or an external force applied to the pen input device 400. According to an embodiment of the disclosure (not illustrated), the holders 431 and 432 may be configured as an integral holder.

The second non-conductive portion 600 of the pen input device 400 may overlap the first non-conductive portion 540 of the rear plate 311 when viewed from above the rear plate 311. At least a portion of the antenna module 500 may overlap the first non-conductive portion 540 and the second non-conductive portion 600 when viewed from above the rear plate 311. The first non-conductive portion 540 and the second non-conductive portion 600 may be disposed to overlap each other in a direction in which a main beam 900 of the antenna module 500 is radiated. When the antenna module 500 transmits or receives an RF signal, the RF signal may travel through the first non-conductive portion 540 (e.g., an RF window area) and the second non-conductive portion 600.

The rear plate 311 may include a conductive area extending between the first magnetic body 361 and the fourth magnetic body 461, between the second magnetic body 362 and the fifth magnetic body 462, or between the third magnetic body 363 and the sixth magnetic body 463 without overlapping the antenna module 500 when viewed from above the rear plate 311. The conductive area may extend between the first magnetic body 361 and the fourth magnetic body 461, between the second magnetic body 362 and the fifth magnetic body 462, or between the third magnetic body 363 and the sixth magnetic body 463, but, since the magnetic force of the magnetic body is capable of passing through the conductive area, the attractive force between the magnetic bodies aligned with each other may be maintained.

The pen input device 400 may include a first section 401, a second section 402, or a third section 403. The first section 401 may be located between the second section 402 and the third section 403. The first section 401 may overlap the first non-conductive portion 540 when the pen input device 400 is attached to the host device 300. The first section 401 may include the second non-conductive portion 600 and may include substantially no conductive material. The second section 402 may include a conductive material that may have an electromagnetic effect on an RF signal transmitted and/or received by the antenna module 500, such as the pen tip sensor 420, the third printed circuit board 440, and/or the battery 470. A conductive material may be omitted from the third section 403. For example, at least a portion of the second non-conductive portion 600 may be included in the third section 403. The third section 403 may alternatively include a conductive material.

The first section 401 in which the second non-conductive portion 600 is provided may be located between the fourth magnetic body 461 and the fifth magnetic body 462 when viewed from above the rear plate 311.

The second non-conductive portion 600 may include a partial section of the second housing 410 overlapping the first non-conductive portion 540 when viewed in the direction in which the main beam 900 is radiated, and a non-conductive member 490 (e.g., a spacer) located in the inner space 601 of the partial section.

The radiation performance of the antenna module 500 may not be substantially affected by the non-conductive member 490. In some cases, the radiation performance of the antenna module 500 may be within a critical range of the performance security level although it may be affected by the non-conductive member 490. As the permittivity of the non-conductive member 490 is lower, the effect of the non-conductive member 490 on the radiation performance of the antenna module 500 may be reduced, and in consideration of this, the non-conductive member 490 may be formed of various materials.

When the permittivity of the non-conductive member 490 makes it difficult to secure the radiation performance of the antenna module 500, in order to secure the radiation performance, tuning may be performed based on various parameters such as the shape of the non-conductive member 490 or the spatial positional relationship between the non-conductive member 490 and the antenna module 500. The non-conductive portion 490 provided through such tuning may make it possible to secure the radiation performance of the antenna module 500 in the state in which the pen input device 400 is attached to the host device 300.

The non-conductive member 490 may be at least partially filled in the inner space 601 and may contribute to the rigidity capable of enduring an external impact or external pressure caused by the fall of the pen input device 400 or an external force applied to the pen input device 400. The non-conductive member 490 filled in the inner space 601 may be connected to a holder 431 or 432 or configured integrally with the holder 431 or 432, and may contain the same material as the holder 431 or 432.

The non-conductive member 490 may include various polymers such as epoxy filled in the inner space of the tubular housing 410. For example, at least a portion of the non-conductive member 490 may be disposed in the second section 402 or the third section 403. As another example, the second section 402 may be formed of the tubular housing 410, the first section 401 may be formed of a non-conductive member, and the second section 402 and the first section 401 may be coupled to each other.

The inner space 601 may be configured as an empty space without the non-conductive member 490.

Referring to FIG. 10, the host device 300 may include a processor 1001 (e.g., the processor 120 in FIG. 1) electrically connected to the first printed circuit board 340, a first radio communication circuit 1002 (e.g., the radio communication module 192 in FIG. 1), a memory 1005 (e.g., the memory 130 in FIG. 1), or a first power management circuit 1006 (e.g., the power management module 188 in FIG. 1). In an embodiment, the processor 1001, the first radio communication circuit 1002, the memory 1005, or the first power management circuit 1006 may be disposed on the first printed circuit board 340 via a conductive bonding member such as solder.

The second printed circuit board 800 of the antenna module 500 may be disposed to be substantially parallel to the first printed circuit board 340. Alternatively, the second printed circuit board 800 of the antenna module 500 may be disposed to be non-parallel to the first printed circuit board 340. For example, the second printed circuit board 800 may be disposed such that the first surface 801 substantially faces the lateral member 318.

The antenna module 500 may be electrically connected to the first printed circuit board 340 via various electrical paths such as a flexible printed circuit board or a coaxial cable. The antenna module 500 may additionally or alternatively be electrically connected to the first printed circuit board 340 via various electrical paths such as a board-to-board connector or an interposer.

Referring to FIGS. 7, 8, and 10, the second radio communication circuit 720 of the antenna module 500 may transmit and/or receive a first signal of at least a partial frequency band from about 3 GHz to about 100 GHz via the antenna array 810. For example, the second radio communication circuit 720 may up-convert or down-convert a frequency for a transmitted or received signal. The second radio communication circuit 720 may receive an IF signal from the second radio communication module 1004 of the first radio communication circuit 1002, and may up-convert the received IF signal into an RF signal. The second radio communication circuit 720 may down-convert an RF signal (e.g., millimeter waves) received via the antenna array 810 into an IF signal, and the IF signal may be provided to the second radio communication module 1004 of the first radio communication circuit 1002.

The processor 1001 may control at least one component (e.g., a hardware or software component) of the host device 300 electrically connected to the processor 1001 by executing, for example, software and may perform various data processes or arithmetic operations. The processor 1001 may transmit and/or receive a signal via the first radio communication circuit 1002. The processor 1001 may write data to and read data from the memory 1005. At least a portion of the first radio communication circuit 1002 and/or the processor 1001 may be referred to as a communication processor (CP).

The first radio communication circuit 1002 may perform functions for transmitting or receiving a signal through a radio channel. The first radio communication circuit 1002 may perform a function of changing between a baseband signal and/or a bit stream according to a physical layer standard of a system. For example, when transmitting data, the first radio communication circuit 1002 may generate complex symbols by encoding and modulating the transmitted bit stream. For example, upon data reception, the first radio communication circuit 1002 may demodulate and decode a baseband signal to restore a received bit stream. The first radio communication circuit 1002 may up-convert an RF signal, transmit the up-converted RF signal via at least one antenna, and may down-convert an RF signal received via at least one antenna into a baseband signal. The first radio communication circuit 1002 may include elements such as a transmission filter, an amplifier, a mixer, an oscillator, a digital to analog converter (DAC), or an analog to digital converter (ADC).

The first radio communication circuit 1002 may include a plurality of radio communication modules for processing signals of different frequency bands. For example, the first radio communication circuit 1002 may include a plurality of radio communication modules to support a plurality of different radio access technologies. For example, different radio access technologies may include Bluetooth low energy (BLE), Wi-Fi, WiFi gigabyte (WiGig), or a cellular network (e.g., long term evolution (LTE)). As another example, the different frequency bands may include a super-high frequency (SHF) (e.g., about 2.5 GHz or about 5 GHz) band and a millimeter wave (e.g., about 60 GHz) band.

The first radio communication circuit 1002 may include a baseband processor, at least one communication circuit (e.g., an intermediate frequency integrated circuit (IFIC)), or a radio frequency integrated circuit (RFIC). The first radio communication circuit 1002 may include, for example, a baseband processor separate from the processor 1001 (e.g., an application processor (AP)).

The first radio communication circuit 1002 may include at least one of a first radio communication module 1003 or a second radio communication module 1004. The host device 300 may further include one or more interfaces configured to support chip-to-chip communication between the first radio communication circuit 1002 and the processor 1001. The processor 1001 and the first radio communication module 1003 or the second radio communication module 1004 may transmit or receive data (or signals) by using the chip-to-chip interface (e.g., an inter-processor communication channel).

The first radio communication module 1003 or the second radio communication module 1004 may provide an interface configured to communicate with other entities. The first radio communication module 1003 may support radio communication related to a first network (e.g., the first cellular network 292 in FIG. 2) using, for example, at least one antenna 1007. The second radio communication module 1004 may support radio communication regarding a second network (e.g., the second cellular network 294 in FIG. 2) using, for example, the antenna module 500. The first network may include a 4th generation (4G) network, and the second network may include a 5th generation (5G) network. The first network may be related to Wi-Fi or a global positioning system (GPS).

The first radio communication module 1003 may receive a high-frequency signal (hereinafter referred to as an "RF signal") related to the first network (e.g., a 4G network) via the at least one antenna 1007, modulate (e.g., down-convert) the received RF signal into a low-frequency signal (hereinafter, referred to as a "baseband signal"), and transmit the low-frequency signal to the processor 1001. The first radio communication module 1003 may receive a baseband signal related to the first network from the processor 1001, modulate (e.g., up-converts) the received baseband signal into an RF signal, and transmit the RF signal to the outside via the at least one antenna 1007. The first radio communication module 1003 may include an RFIC. When modulating an RF signal into a baseband signal or modulating a baseband signal into an RF signal, an input of a local oscillator (LO) may be used.

The second radio communication module 1004 may receive a baseband signal related to the second network from the processor 1001. The second radio communication module 1004 may up-convert a baseband signal to an IF signal by using an input of a local oscillator (LO) (hereinafter, referred to as an "LO signal"), and transmit the IF signal to the antenna module 500. The antenna module 500 may receive the IF signal from the second radio communication module 1004. The antenna module 500 may up-convert the IF signal to an RF signal by using the LO signal, and transmit the RF signal to the outside via the antenna array 810 (see FIG. 7) included in the antenna module 500. The antenna module 500 may receive the RF signal via the antenna array 810. The antenna module 500 may down-convert the RF signal to an IF signal by using the LO signal, and transmit the IF signal to the second radio communication module 1004. The second radio communication module 1004 may receive the IF signal from the antenna module 500. The second radio communication module 1004 may down-convert the IF signal to a baseband signal by using the LO signal, and transmit the baseband signal to the first radio communication circuit 1002. The second radio communication module 1004 may include an IFIC. The second radio communication module 1004 may transmit and/or receive a second signal in a frequency band between about 5 GHz and about 15 GHz.

The second radio communication circuit 720 (see FIG. 8) of the antenna module 500 may include a plurality of transmission/reception paths. For example, the second radio communication circuit 720 of the antenna module 500 may include a beamforming system configured to process a transmission signal or a reception signal so that radio waves radiated from the plurality of antenna elements of the antenna array 810 (see FIG. 7) are concentrated to a specific direction in a space. For example, the beamforming system may adjust the phase of a current supplied to the plurality of antenna elements of the antenna array 810 to form a beam pattern (e.g., a beam width and a beam direction).

The memory 1005 may store codebook information related to the beamforming. The processor 1001, the second radio communication module 1004, or the second radio communication circuit 720 (see FIG. 7) of the antenna module 500 may efficiently control (e.g., allocate or arrange) a plurality of beams via the plurality of antenna elements of the antenna array 810 (see FIG. 7) based on the codebook information.

The first radio communication module 1003 and/or the second radio communication module 1004 may configure one module with the processor 1001. For example, the first radio communication module 1003 and/or the second radio communication module 1004 may be configured integrally with the processor 1001. The first radio communication module 1003 and/or the second radio communication module 1004 may be disposed in a single chip or may be configured in the form of an independent chip form.

The processor 1001 and one wireless communication module (e.g., the first wireless communication module 1003) may be integrally configured in a single chip (system on a chip (SoC)), and another radio communication module (e.g., the second radio communication module 1004) may be configured in the form of an independent chip.

The first power management circuit 1006 may manage power supplied to the host device 300 by using the power of the battery electrically connected to the first printed circuit board 340 (e.g., the battery 189 in FIG. 1). The second power management circuit 730 (see FIG. 8) of the antenna module 500 may receive power from the first power management circuit 1005 and use the received power to manage the power supplied to the antenna module 500. The second power management circuit 730 of the antenna module 500 may be implemented as, for example, at least a portion of a PMIC. According to some embodiments of the disclosure, the second power management circuit 730 of the antenna module 500 may be omitted from the antenna module 500, and, for example, the first power management circuit 1006 may manage the power supplied to the antenna module 500.

The first surface 801 of the antenna module 500 may be spaced apart from and face the first non-conductive portion 540 (e.g., RF window area) with an air gap G interposed therebetween. For example, the first surface 801 and the first non-conductive portion 540 may be disposed to be substantially parallel to each other. The air gap G may reduce deformation or distortion of a beam pattern formed from the antenna module 500 or may make it possible to secure coverage (communication range) toward the rear plate 311. By the beamforming system, the antenna module 500 may form a main beam 900 (see FIG. 9) in which a relatively large amount of energy is radiated in the direction in which the first surface 801 is oriented (e.g., the −z axis direction). For example, when there is no air gap G, deformation or distortion of a beam pattern may occur. The deformation or distortion of the beam pattern may degrade coverage (communication range) performance toward the rear plate 311.

The non-conductive member 490 of the second non-conductive portion 600 included in the pen input device 400 is not limited to the embodiment of FIG. 9 or FIG. 10 and may be configured in various other shapes. Various other possible shapes of the non-conductive member 490 are described below with reference to FIGS. 11A to 11C, FIGS. 12A to 12E, FIGS. 13A and 13B, FIGS. 14A and 14B, or FIG. 15, although it is understood that the shape of the non-conductive member 490 is not limited to the illustrated arrangements.

Figure 11A:
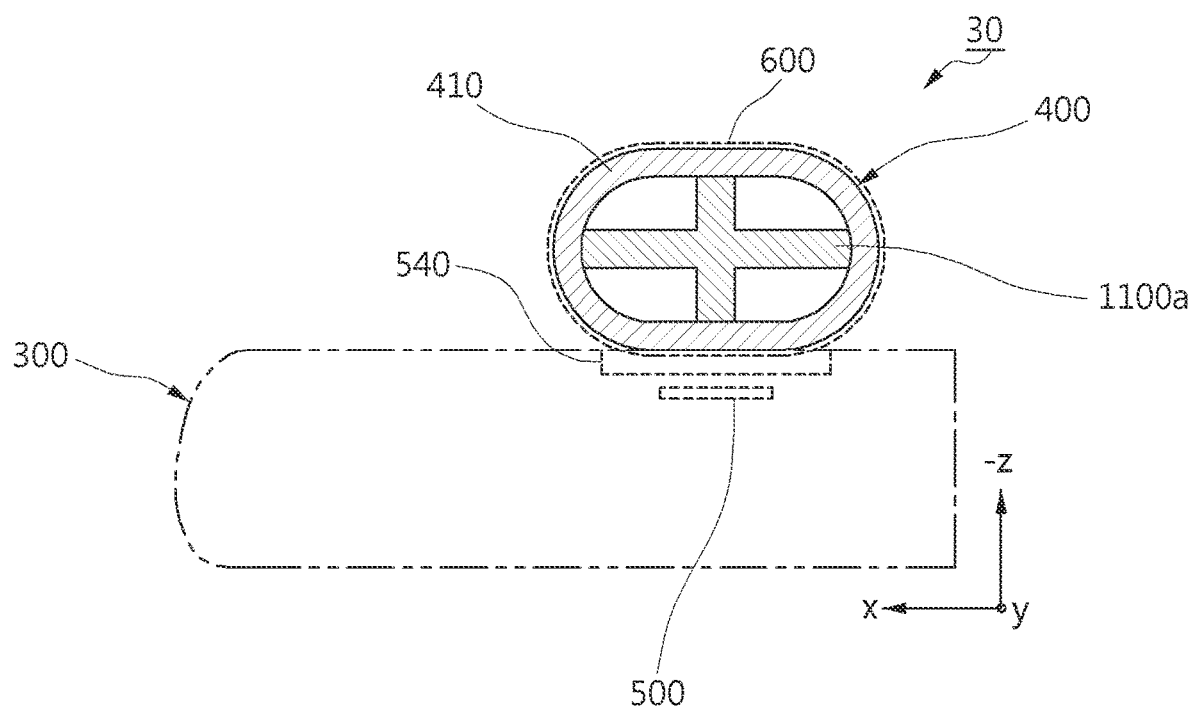
FIGS. 11A, 11B, and 11C are cross-sectional views taken along line B-B' in the electronic device of FIG. 6 according to various embodiments of the disclosure.
Figure 11B:
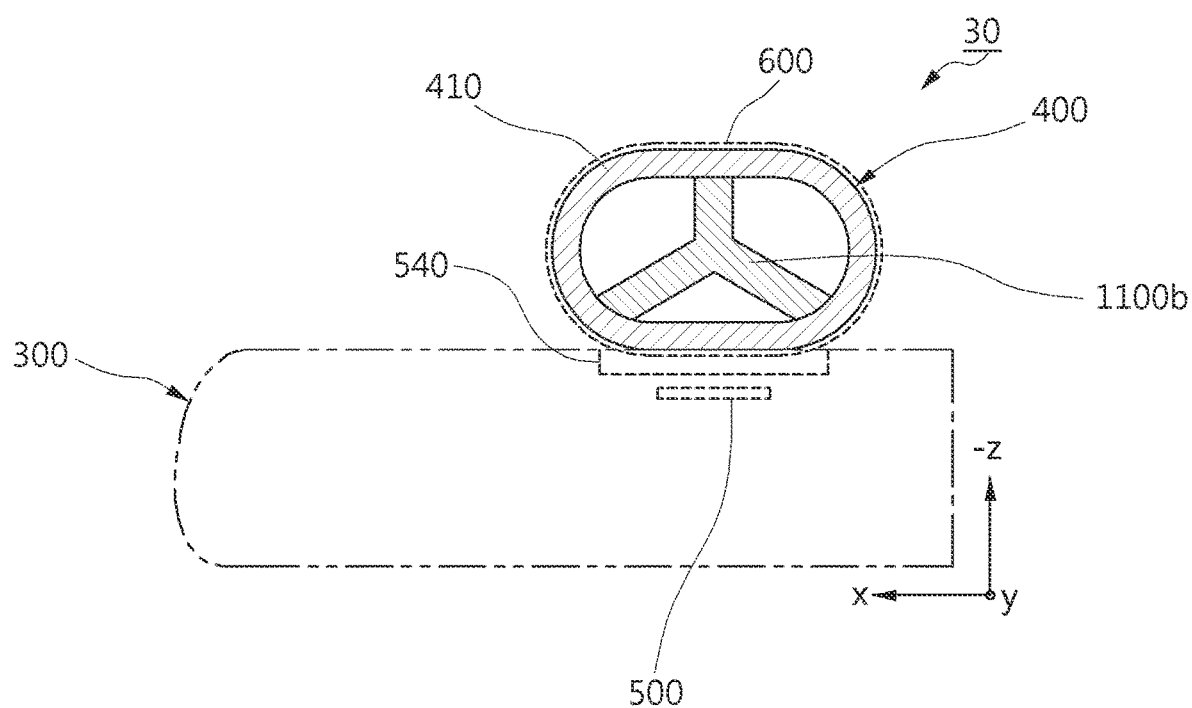
Figure 11C:
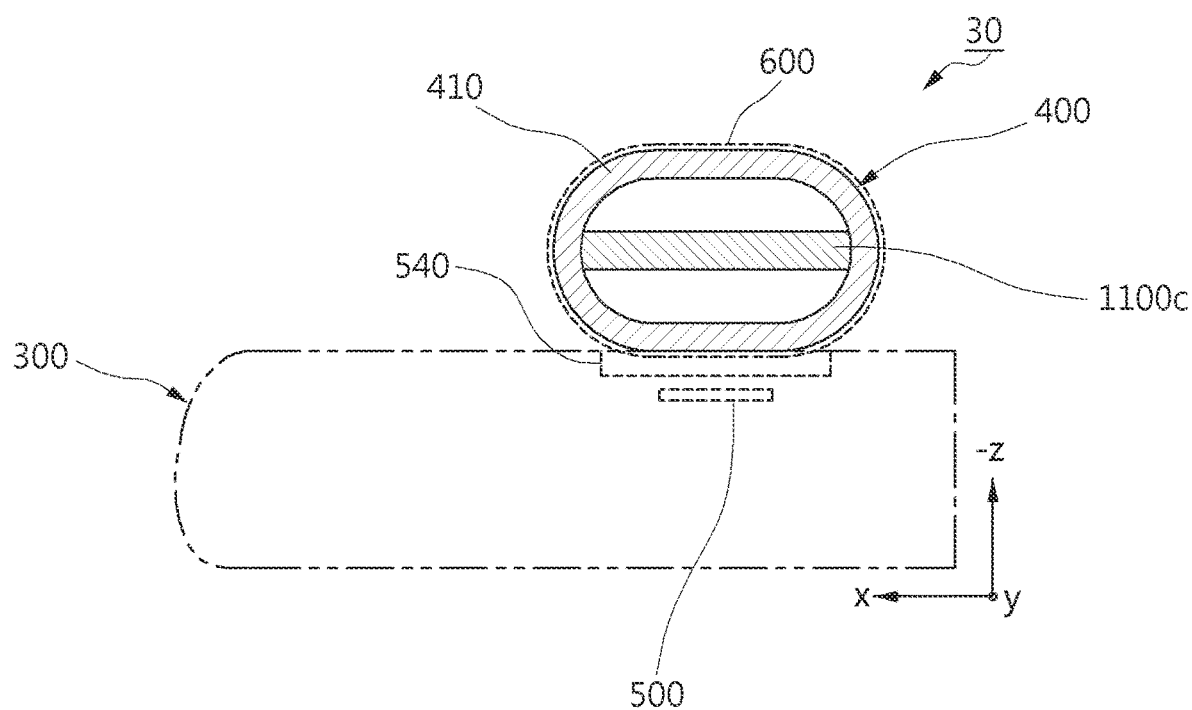

FIGS. 11A, 11B, and 11C are cross-sectional views taken along line B-B' in the electronic device 30 of FIG. 6 according to various embodiments of the disclosure.

FIGS. 11A, 11B, and 11C illustrate one of various cross-sectional shapes of a non-conductive member, for example, of the second non-conductive portion 600 located in the inner space (e.g., the inner space 601 in FIG. 9) of the second housing 410. A redundant description of some of the reference numerals in FIG. 11A, 11B, or 11C will be omitted.

Referring to FIGS. 11A-11C, the non-conductive member 1100a illustrated in FIG. 11A, the non-conductive member 1100b illustrated in FIG. 11B, or the non-conductive member 1100c illustrated in FIG. 11C may be small in filling amount in the inner space of the second housing 410, compared to the non-conductive member 490 of FIG. 10. For this reason, compared to the non-conductive member 490 of FIG. 10, the effect of the non-conductive member 1100a, 1100b, or 1100c on the radiation performance of the antenna module 500 may be reduced. According to various embodiments of the disclosure, the non-conductive member may have a cross-sectional shape that is capable of deformation (e.g., distortion or bending) or damage of the pen input device 400 with respect to an external impact or external pressure caused by the fall of the pen input device 400 or an external force applied to the pen input device 400, like the non-conductive member 1100a of FIG. 11A or the non-conductive member 1100b of FIG. 11B.

FIGS. 12A, 12B, 12C, 12D, and 12E are cross-sectional views taken along line B-B' in the electronic device 30 of FIG. 6 according to various embodiments of the disclosure.

FIGS. 12A, 12B, 12C, 12D, and 12E illustrate one of various cross-sectional shapes of a non-conductive member, for example, of the second non-conductive portion 600 located in the inner space (e.g., the inner space 601 in FIG. 9) of the second housing 410. A redundant description of some of the reference numerals in FIG. 12A, 12B, 12C, 12D, or 12E will be omitted.

Figure 12A:
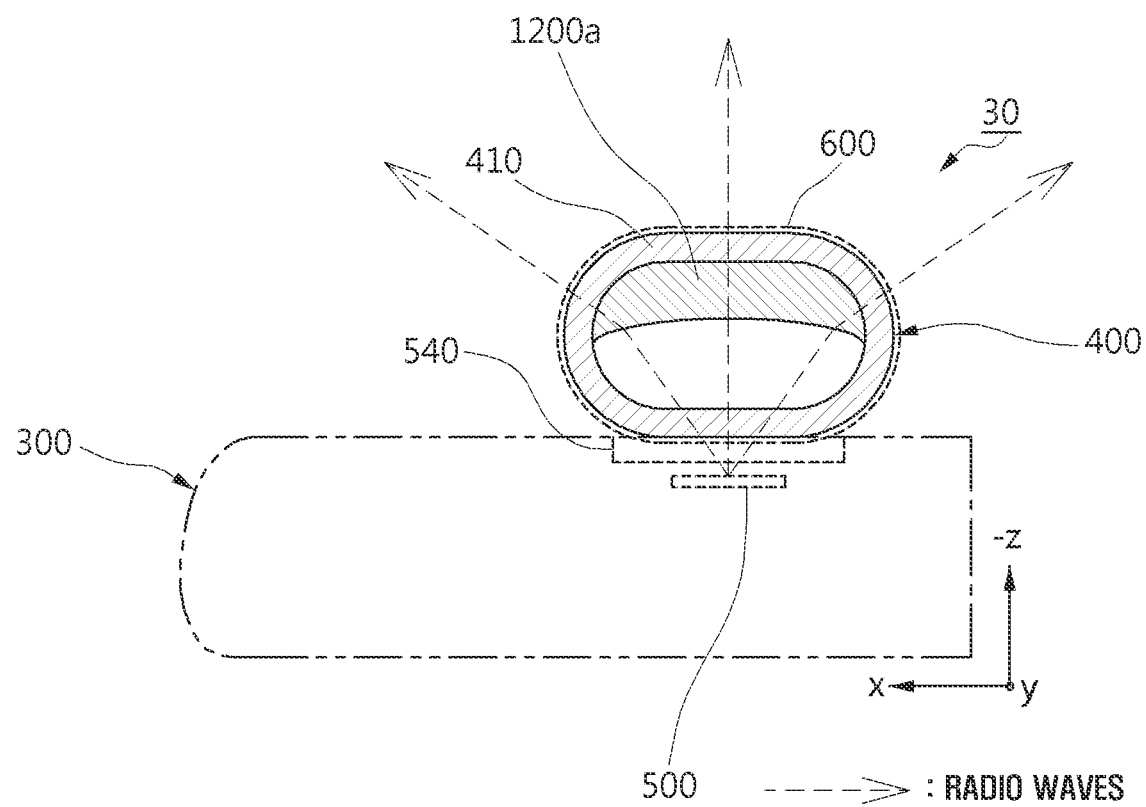
FIGS. 12A, 12B, 12C, 12D and 12E are cross-sectional views taken along line B-B' in the electronic device of FIG. 6 according to various embodiments of the disclosure.
Figure 12B:
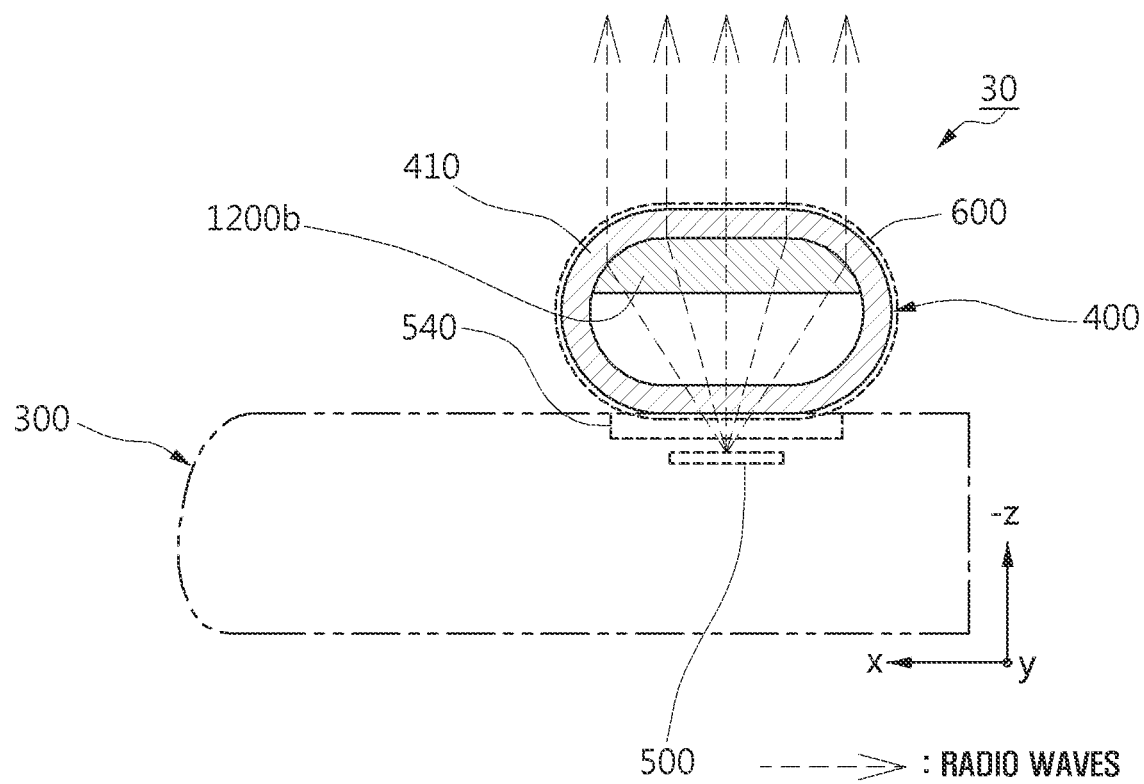
Figure 12C:
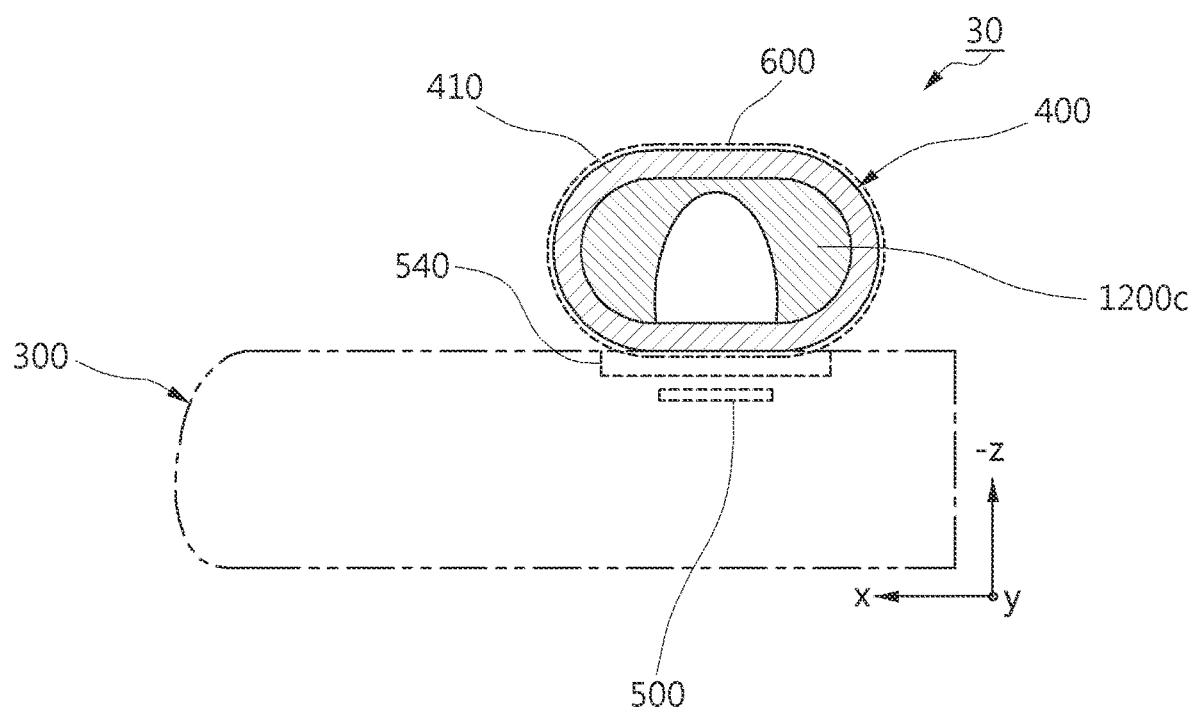
Figure 12D:
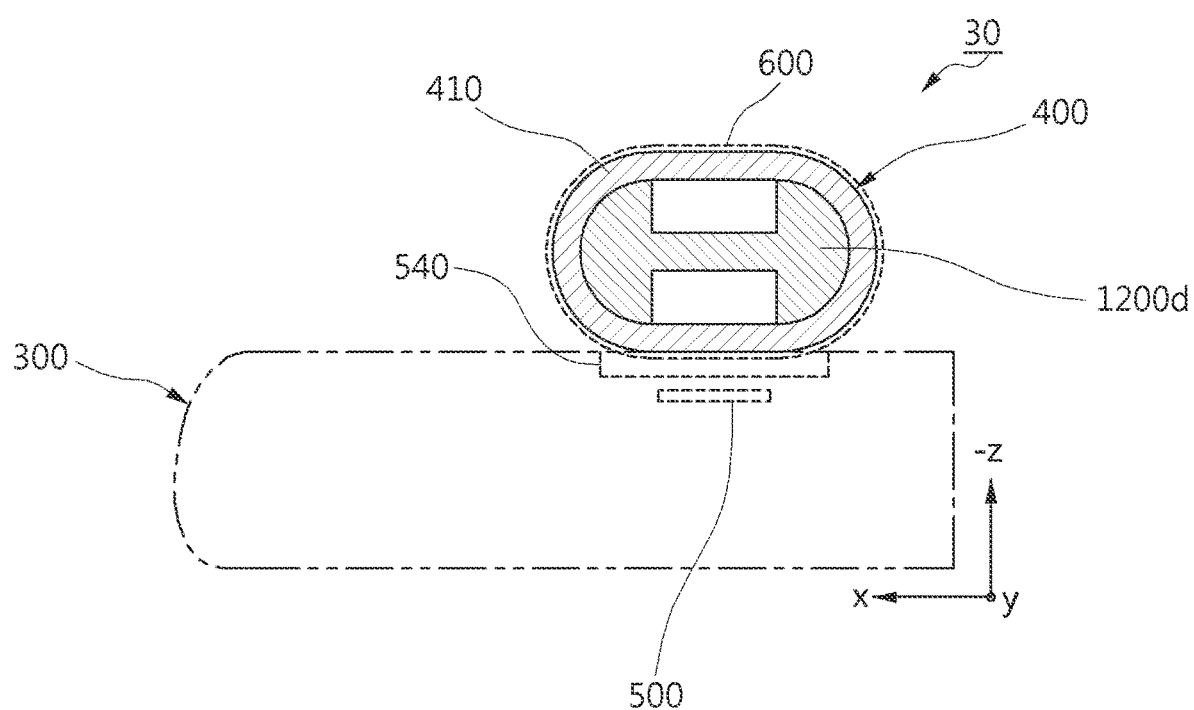
Figure 12E:
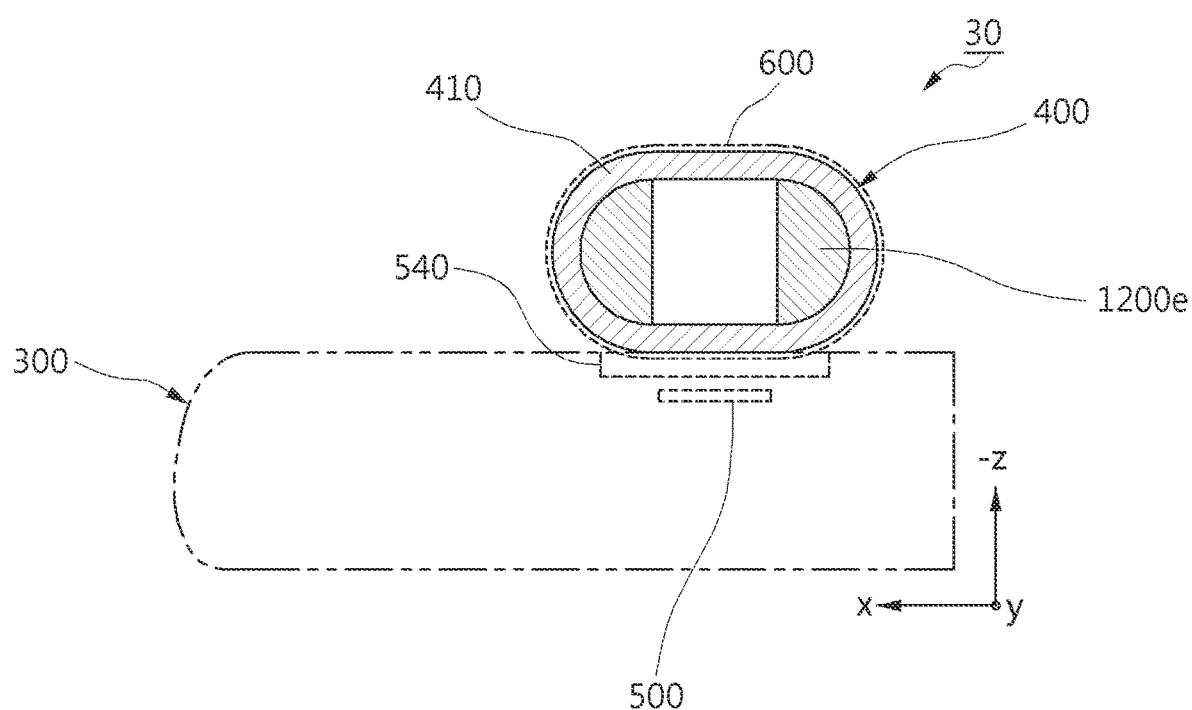

The non-conductive member of the second non-conductive portion 600 located in the inner space of the second housing 410 may be implemented as a dielectric lens (or an electromagnetic lens) like, for example, the non-conductive member 1200a illustrated in FIG. 12A or the non-conductive member 1200b illustrated in FIG. 12B. The dielectric lens may focus or diverge electromagnetic waves just like an optical lens refract light waves, and due to the dielectric lens, coverage may be adjusted. The non-conductive member operating as a dielectric lens may be configured in various different cross-sectional shapes that focus or diverge electromagnetic waves like the non-conductive member 1200c illustrated in FIG. 12C, the non-conductive member 1200d illustrated in FIG. 12D, or the non-conductive member 1200e illustrated in FIG. 12E.

Figure 13A:
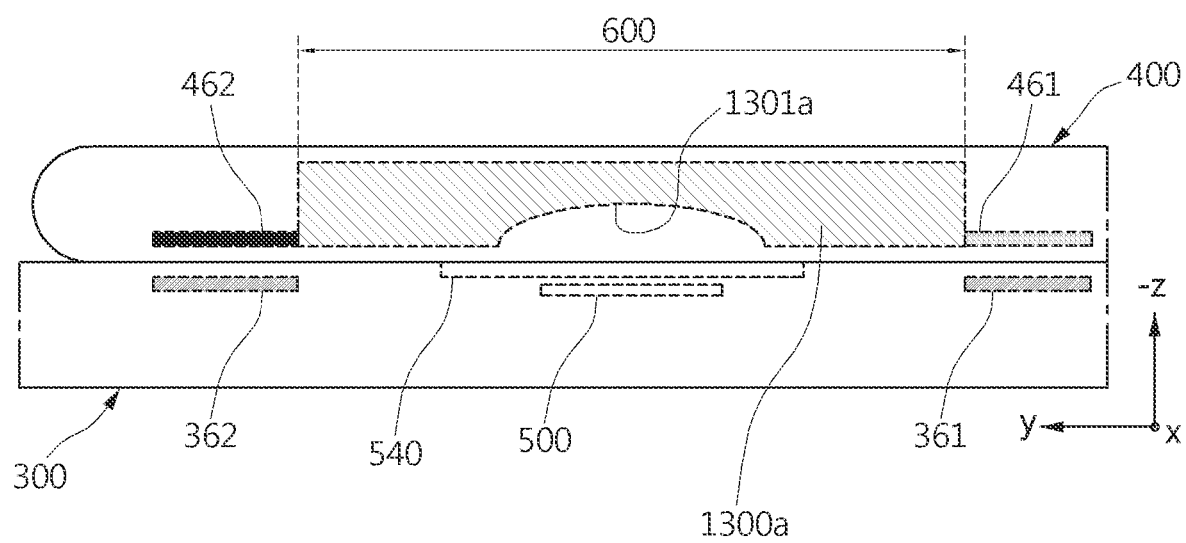
FIGS. 13A and 13B are cross-sectional views taken along line A-A' in the electronic device of FIG. 6 according to various embodiments of the disclosure.
Figure 13B:
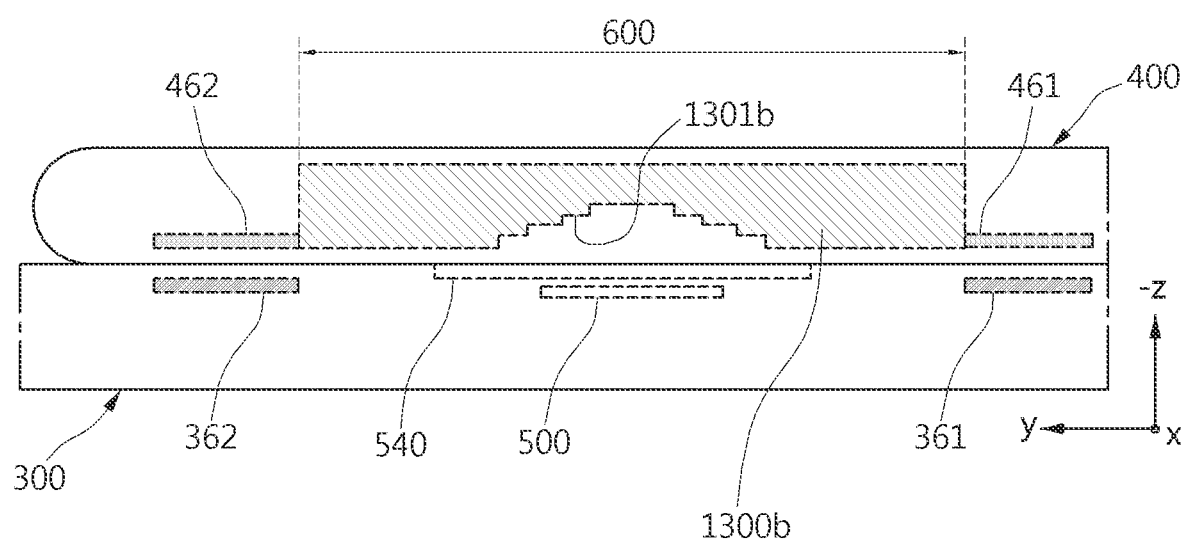

FIGS. 13A and 13B are cross-sectional views taken along line A-A' in the electronic device 30 of FIG. 6 according to various embodiments of the disclosure.

FIG. 13A or 13B illustrate one of various cross-sectional shapes of a non-conductive member, for example, of the second non-conductive portion 600 located in the inner space (e.g., the inner space 601 in FIG. 9) of the second housing 410. A redundant description of some of the reference numerals in FIG. 13A or FIG. 13B will be omitted.

Referring to FIGS. 13A and 13B, one surface (see reference numeral "1301a" in FIG. 13A or reference numeral "1301b" in FIG. 13B) provided on a non-conductive member (e.g., the non-conductive member 1300a illustrated in FIG. 13A or the non-conductive member 1300b illustrated in FIG. 13B) of the second non-conductive portion 600 located in the inner space of the second housing 410 to face the antenna module 500 may be convex in the −z-axis direction. For example, the one surface 1301a of the non-conductive member 1300a of FIG. 13A may include a curved surface convex in the −z axis direction. For example, the one surface 1301b of the non-conductive member 1300b of FIG. 13B may have a convex step shape in the −z axis direction. The non-conductive member (e.g., the non-conductive member 1300a in FIG. 13A or the non-conductive member 1300b in FIG. 13B) may operate as a dielectric lens to focus or diverge electromagnetic waves, and the coverage may be adjusted due to the dielectric lens.

Figure 14A:
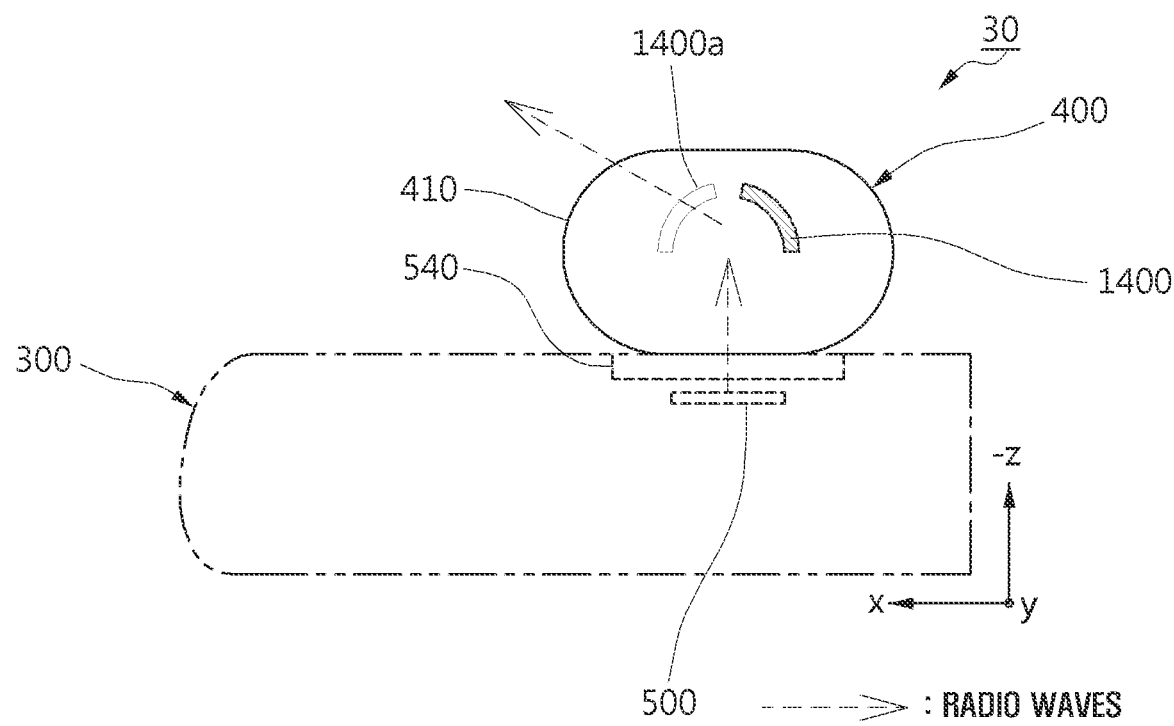
FIG. 14A is a cross-sectional view of the electronic device of FIG. 6 taken along line B-B' according to an embodiment of the disclosure.
Figure 14B:
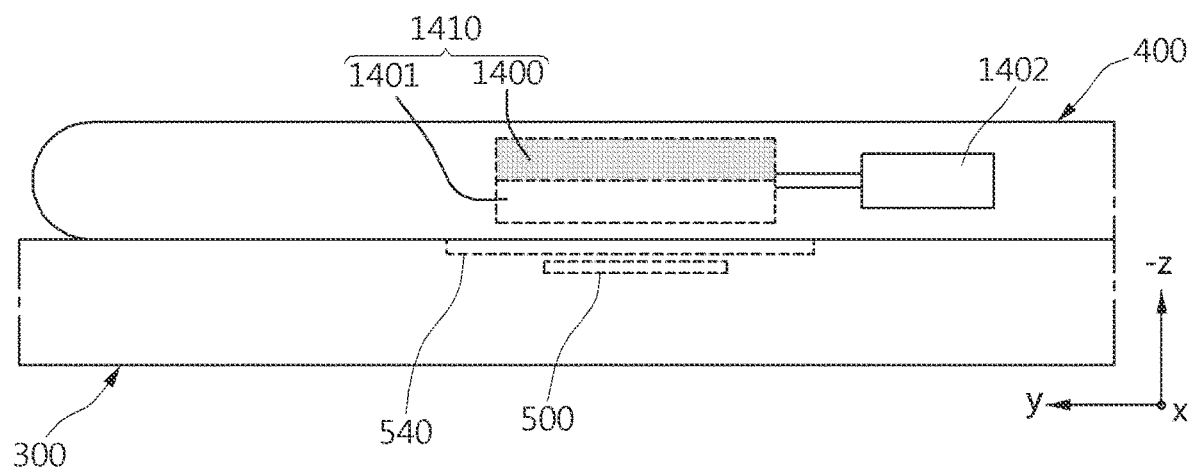
FIG. 14B is a cross-sectional view of the electronic device of FIG. 6 taken along line A-A' according to an embodiment of the disclosure.

FIG. 14A is a cross-sectional of the electronic device 30 of FIG. 6 taken along line B-B' according to an embodiment of the disclosure. FIG. 14B is a cross-sectional view of the electronic device 30 of FIG. 6 taken along line A-A' according to an embodiment of the disclosure.

A redundant description of some of the reference numerals in FIG. 14A or FIG. 14B will be omitted.

Referring to FIG. 14A, the pen input device 400 may include at least one conductive member 1400 located inside the second housing 410 to replace the non-conductive member 490 of FIG. 9, or coupled to the non-conductive member 490 or the second housing 410 of FIG. 9 and located inside the pen input device 400. At least one conductive member 1400 may operate as a reflector. The at least one conductive member 1400 may change the coverage by affecting the electromagnetic waves radiated from the antenna module 500. The electromagnetic waves radiated from the antenna module 500 may be reflected by a reflector so that the traveling direction of the electromagnetic waves may be changed, and based this, coverage may be formed.

Referring to FIG. 14B, the pen input device 400 may include a rotation body 1410 including a non-conductive member 1401 and at least one conductive member 1400 coupled to the non-conductive member 1401. The pen input device 400 may include a rotation device (e.g., a motor) 1402 connected to the rotation body 1410. Due to the driving of the rotating device 1402, the rotation body 1410 is rotated, whereby the conductive member 1400 may be moved to a different position as indicated by reference numeral "1400a" of FIG. 14A. The coverage may vary depending on the position of the at least one conductive member 1400. The shape or position of the conductive member 1400 acting as a reflector is not limited to the embodiment of FIG. 14A or FIG. 14B and may be configured in various other shapes.

Figure 15:
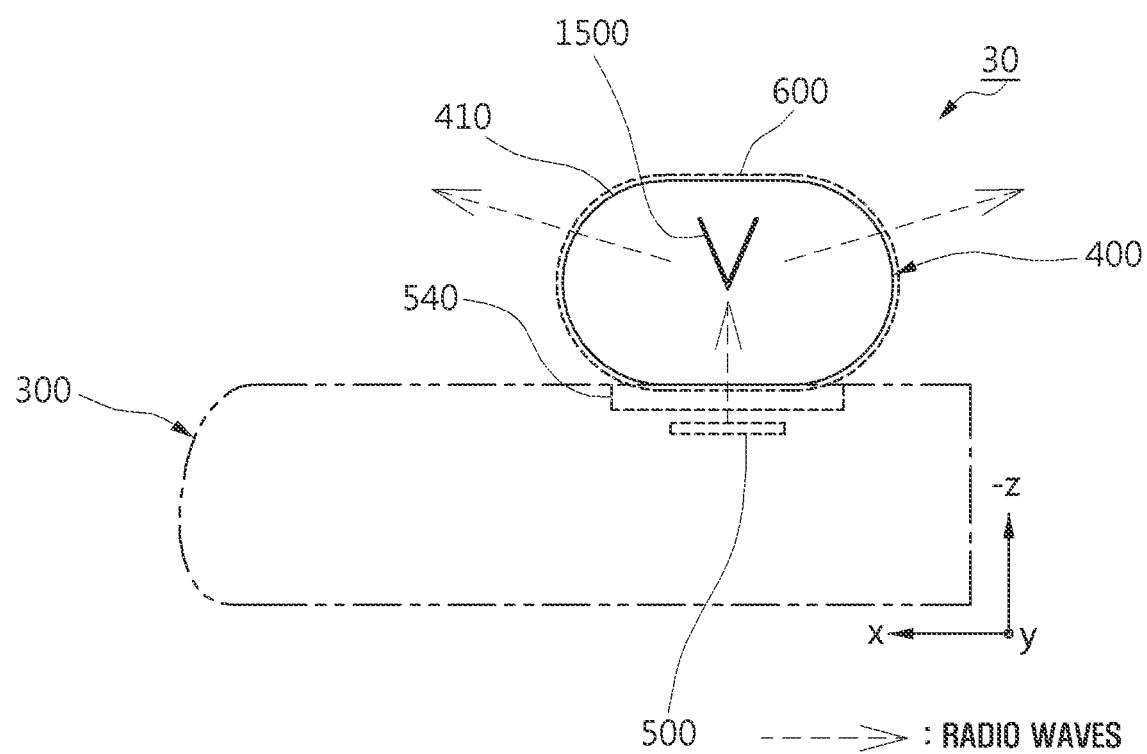
FIG. 15 is a cross-sectional view of the electronic device of FIG. 6 taken along line B-B' according to an embodiment of the disclosure.

FIG. 15 is a cross-sectional of the electronic device 30 of FIG. 6 taken along line B-B' according to an embodiment of the disclosure.

A redundant description of some of the reference numerals of FIG. 15 will be omitted.

Referring to FIG. 15, the pen input device 400 may include at least one conductive member 1500 located inside the second housing 410 to replace the non-conductive member 490 of FIG. 9, or coupled to the non-conductive member 490 or the second housing 410 of FIG. 9 and located inside the pen input device 400. At least one conductive member 1500 may operate as a reflector. The electromagnetic waves radiated from the antenna module 500 may be reflected by the reflector so that the traveling direction of the electromagnetic waves may be variously formed, and based on this, the coverage may be expanded. The shape or position of the at least one conductive member 1500 acting as a reflector is not limited to the embodiment of FIG. 15 and may be configured in various other shapes. The at least one conductive member 1500 may be implemented to be connected to the rotation device to be movable to various positions as in the embodiment of FIG. 14B.

Figure 16A:
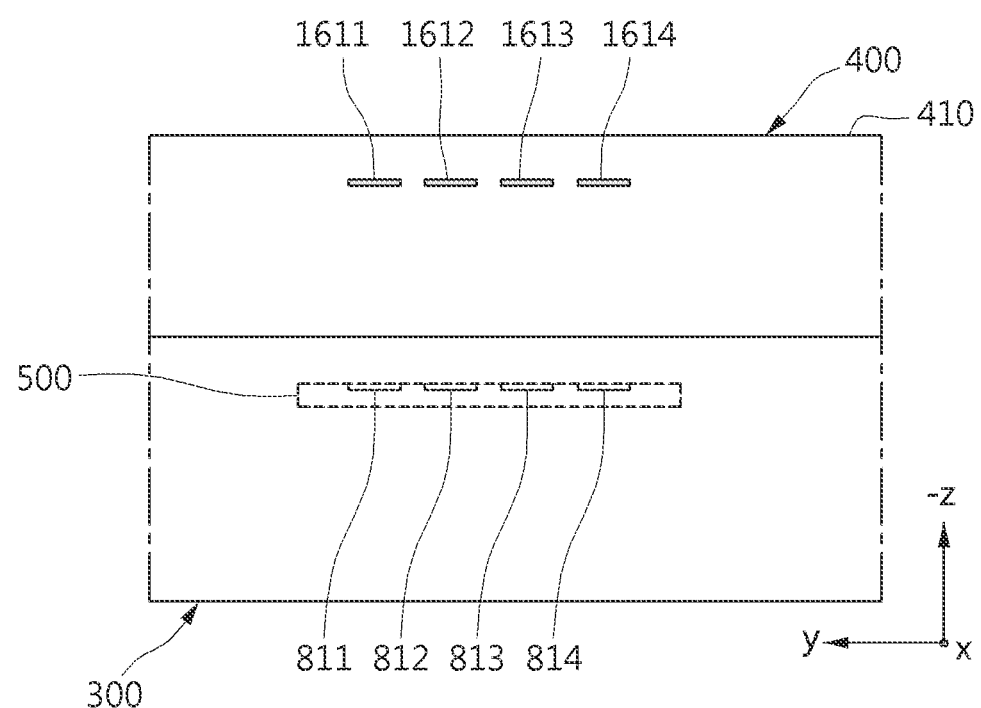
FIG. 16A is a cross-sectional view of the electronic device of FIG. 6 taken along line B-B' according to an embodiment of the disclosure.

FIG. 16A is a cross-sectional of the electronic device 30 of FIG. 6 taken along line B-B' according to an embodiment of the disclosure. FIGS. 16B, 16C, 16D, and 16E are views of the electronic device 30 of FIG. 16A when viewed in the z-axis direction according to various embodiments of the disclosure.

A redundant description of some of the reference numerals of FIG. 16A will be omitted.

Referring to FIG. 16A, the pen input device 400 may include a plurality of conductive portions 1611, 1612, 1613, and 1614 located inside the second housing 410 to replace the non-conductive member 490 of FIG. 9, or coupled to the non-conductive member 490 of FIG. 9 or the second housing 410 and located inside the pen input device 400. The plurality of conductive portions 1611, 1612, 1613, and 1614 may be physically separated from each other and at least partially overlap the plurality of antenna elements 811, 812, 813, and 814 of the antenna module 500 when viewed in the z-axis direction when viewed in the z-axis direction. For example, the plurality of conductive portions 1611, 1612, 1613, and 1614 may be disposed in a one-to-one correspondence relationship with the plurality of antenna elements 811, 812, 813, and 814. The number or positions of conductive portions may vary without being limited to the embodiment of FIG. 16A. The plurality of conductive portions 1611, 1612, 1613, and 1614 may operate as a director. The plurality of conductive portions 1611, 1612, 1613, and 1614 may be electromagnetically coupled to the plurality of antenna elements 811, 812, 813, and 814 to operate as an antenna radiator. The plurality of conductive portions 1611, 1612, 1613, and 1614 may be indirectly fed with power from the plurality of antenna elements 811, 812, 813, and 814 to operate as an antenna radiator.

The plurality of conductive portions 1611, 1612, 1613, and 1614 may secure coverage while reducing deterioration in radiation performance of the antenna module 500 by the pen input device 400 attached to the host device 300. For example, when radio waves radiated from the plurality of antenna elements 811, 812, 813, and 814 reach the plurality of conductive portions 1611, 1612, 1613, and 1614, a surface current in the form of alternating current may be excited and flow. When the radio waves meet the plurality of conductive portions 1611, 1612, 1613, and 1614 in the course of traveling, substantially all of the energy of the radio waves may be instantaneously changed into a current on the surface of the conductor while coming into contact with the plurality of conductive portions 1611, 1612, 1613, and 1614. The surface current in the form of alternating current may generate radio waves according to a change in the current. The plurality of conductive portions 1611, 1612, 1613, and 1614 may radiate radio waves by using at least some of electromagnetic waves radiated from the antenna module 500, thereby at least securing or compensating coverage.

The plurality of conductive portions 1611, 1612, 1613, and 1614 may expand a bandwidth for transmitting or receiving a signal via the antenna module 500 or form different frequency bands (e.g., multiple bands). According to various embodiments of the disclosure, the plurality of conductive portions 1611, 1612, 1613, and 1614 may reduce electromagnetic noise to improve radiation performance of the antenna module 500.

Figure 16B:
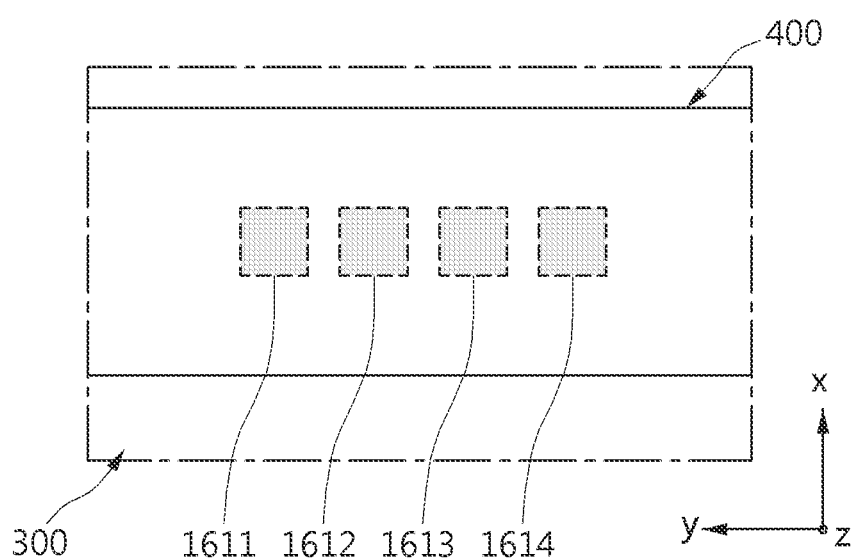
FIGS. 16B, 16C, 16D, and 16E are views of the electronic device of FIG. 16A when viewed in the +z-axis direction according to various embodiments of the disclosure.
Figure 16C:
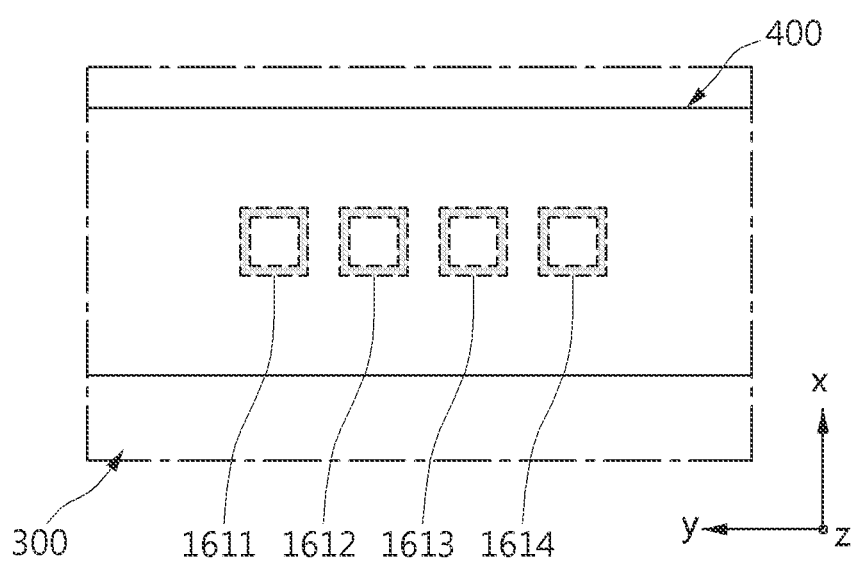
Figure 16D:
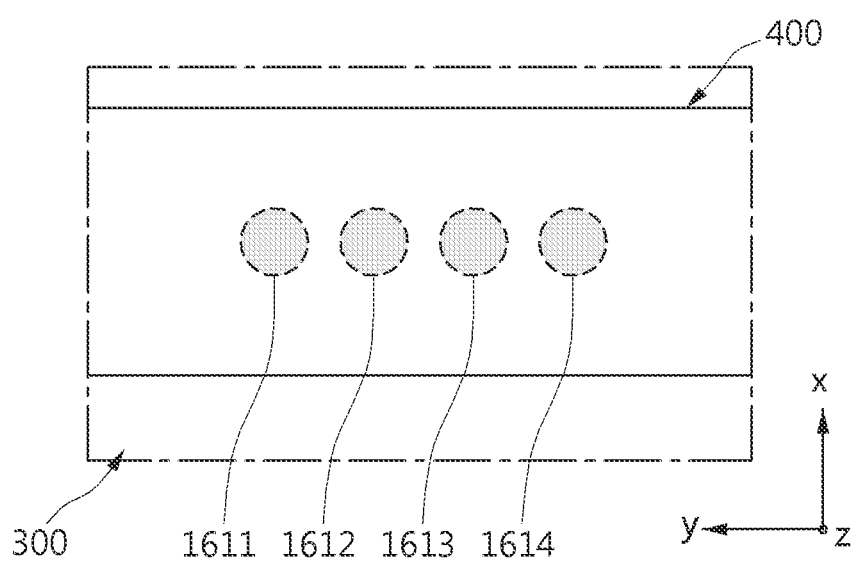
Figure 16E:
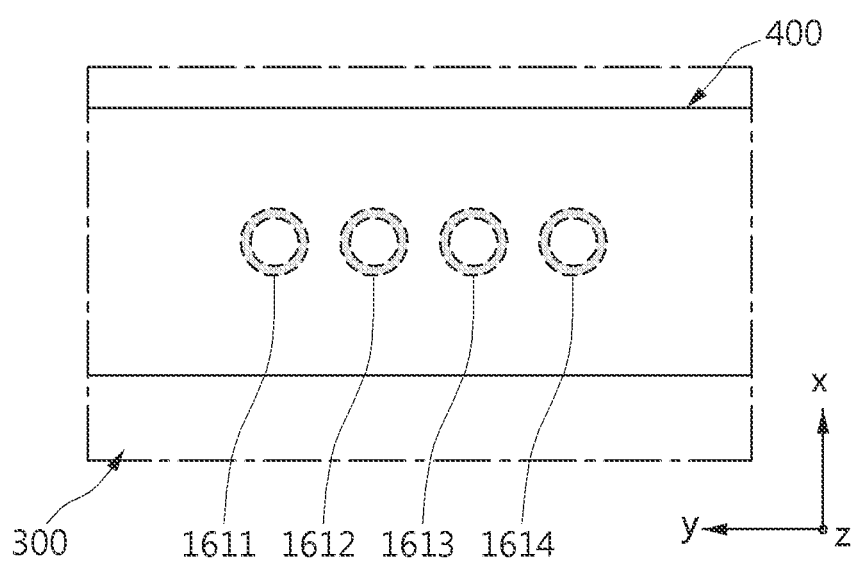

Referring to FIG. 16B, the plurality of conductive portions 1611, 1612, 1613, and 1614 may have, for example, a quadrangular plate shape when viewed in the z-axis direction. Referring to FIG. 16C, as another example, the plurality of conductive portions 1611, 1612, 1613, and 1614 may have a quadrangular ring shape when viewed in the z-axis direction. Referring to FIG. 16D, as another example, the plurality of conductive portions 1611, 1612, 1613, and 1614 may have a circular shape when viewed in the z-axis direction. Referring to FIG. 16E, as another example, the plurality of conductive portions 1611, 1612, 1613, and 1614 may have a circular ring shape. The plurality of conductive portions 1611, 1612, 1613, and 1614 may be formed in various other shapes capable of securing or compensating coverage by radiating radio waves by using at least some of energy radiated from the antenna module 500.

Figure 17:
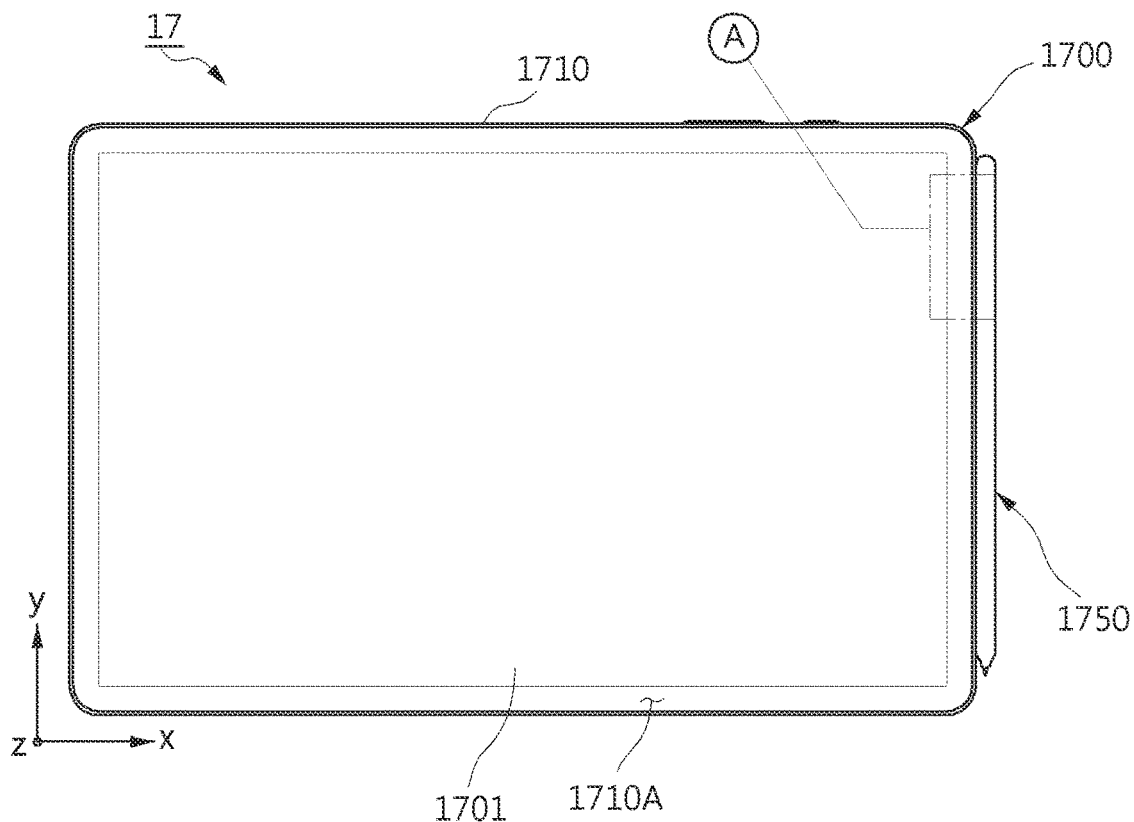
FIG. 17 is a plan view of an electronic device in a state in which a pen input device is attached to a host device according to an embodiment of the disclosure.
Figure 17:
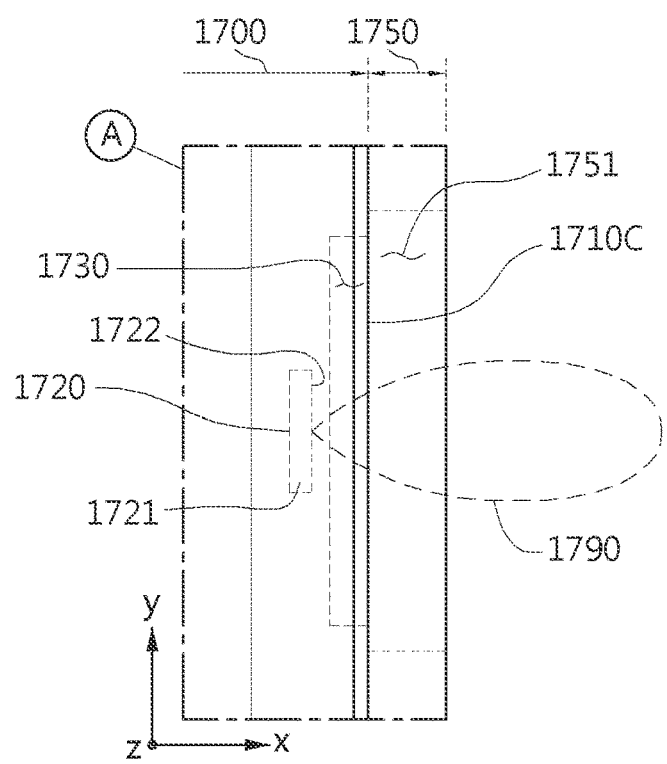

FIG. 17 is a plan view of an electronic device 17 in the state in which a pen input device 1750 is attached to a host device 1700 according to an embodiment of the disclosure.

Referring to FIG. 17, the host device 1700 may include a first housing 1710, and a display 1701 located inside the first housing 1710 and exposed through the front surface 1710A of the housing 1710. The pen input device 1750 may be detachably attached to the lateral surface 1710C (e.g., the lateral surface 310C in FIG. 3) of the host device 1700. The detachably attaching method may be implemented based on the attractive force between magnetic bodies as in the embodiment of FIG. 9, or various other methods may be utilized. At least one of the components of the electronic device 17 may be the same as or similar to at least one of the components of the electronic device 30 of FIG. 3 or FIG. 4, and a redundant description will be omitted below.

The host device 1700 may include an antenna module 1720 (e.g., the antenna module 500 in FIG. 7) located inside the first housing 1710 (e.g., the first housing 310 in FIG. 3) and configured to radiate a main beam 1790 toward a lateral surface 1710C. For example, the antenna module 1720 may include an antenna array (e.g., the antenna array 810 in FIG. 7) located on a first surface 1722 (e.g., the first surface 801 in FIG. 7) of a second printed circuit board 1721 (e.g., the second printed circuit board 800 in FIG. 7) or located inside the second printed circuit board 1721 close to the first surface 1722. The first surface 1722 may face the lateral surface 1710C, and the antenna module 1720 may form a main beam 1790 toward the lateral surface 1710C. The host device 1700 may include a first non-conductive portion 1730 (e.g., the first non-conductive portion 540 in FIG. 5) between the pen input device 1750 and the antenna module 1720. For example, at least a portion of the first non-conductive portion 1730 may be an RF window area. When viewed in the direction in which the main beam 1790 is radiated, the first non-conductive portion 1730 may overlap the antenna array of the antenna module 1720. The antenna module 1720 may be disposed to be spaced apart from the first non-conductive portion 1730 with an air gap (not illustrated) interposed therebetween. The air gap may make it possible, for example, to reduce deformation or distortion of a beam pattern formed from the antenna module 1720 or to secure coverage (communication range) toward the lateral surface 1710C.

The pen input device 1750 may include a second non-conductive portion 1751 (e.g., the second non-conductive portion 600 in FIG. 9) that at least partially overlaps the first non-conductive portion 1730 when viewed in the direction in which the main beam 1790 is radiated. When viewed in the direction in which the main beam 1790 is radiated, at least a portion of the antenna array of the antenna module 1720 may overlap the first non-conductive portion 1730 and the second non-conductive portion 1751. The main beam 1790 may travel through substantially the first non-conductive portion 1730 and the second non-conductive portion 1751. The radiation performance of the antenna module 1720 may be secured by substantially eliminating the conductive material disposed in the direction in which the main beam 1790 is radiated.

According to various embodiments of the disclosure (not illustrated), the pen input device 1750 may include at least one conductive member located to replace the non-conductive member 490 of FIG. 9 or coupled to the non-conductive member 490 of FIG. 9 or the second housing (e.g., the second housing 410 in FIG. 9) and located inside the pen input device 1750, as in embodiment of FIG. 14A or FIG. 15. The at least one conductive member may act as a reflector, and may affect the electromagnetic waves radiated from the antenna module 1720 to change coverage. According to various embodiments of the disclosure, as in the embodiment of FIG. 14B, the pen input device 1750 may include a structure capable of moving at least one conductive member, and the coverage thereof may vary depending on the position of the at least one conductive member.

According to various embodiments of the disclosure (not illustrated), the pen input device 1750 may include a plurality of conductive portions (e.g., the plurality of conductive portions 1611, 1612, 1613, and 1614 in FIG. 16A) located to replace the non-conductive member 490 of FIG. 9 or coupled to the non-conductive member 490 or the second housing (e.g., the second housing 410 in FIG. 9) and located inside the pen input device 1750, as in the embodiment of FIG. 16A. The plurality of conductive portions may act as a director. The plurality of conductive portions may be electromagnetically coupled to an antenna array of the antenna module 1720 to operate as an antenna radiator.

Figure 18:
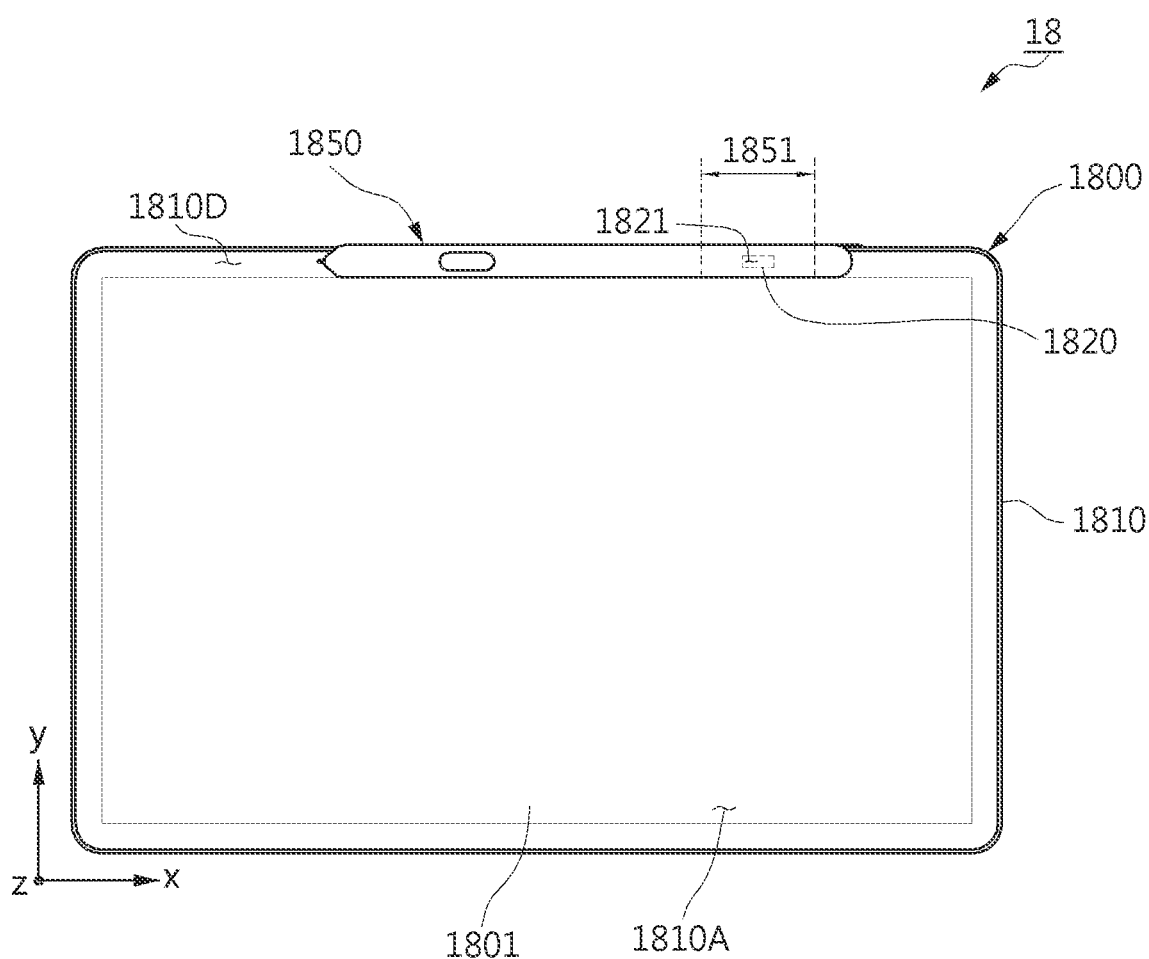
FIG. 18 is a plan view of an electronic device in a state in which a pen input device is attached to a host device according to an embodiment of the disclosure.

FIG. 18 is a plan view of an electronic device 18 in the state in which a pen input device 1850 is attached to a host device 1800 according to an embodiment of the disclosure.

Referring to FIG. 18, for example, the host device 1800 may include a first housing 1810, and a display 1801 located inside the first housing 1810 and exposed through the front surface 1810A of the housing 1810. The pen input device 1850 may be detachably attached to the front surface 1810A (e.g., the front surface 310A in FIG. 3) of the host device 1800. For example, the pen input device 1850 may be attached to a bezel area 1810D (e.g., the bezel area 310D of FIG. 3). When viewed from above the front surface 1810A, the pen input device 1850 may not cover the display 1801. The detachably attaching method may be implemented based on, for example, the attractive force between magnetic bodies as in the embodiment of FIG. 9, or various other methods may be utilized. At least one of the components of the electronic device 18 may be the same as or similar to at least one of the components of the electronic device 30 of FIG. 3 or FIG. 4, and a redundant description will be omitted below.

The host device 1800 may include an antenna module 1820 (e.g., the antenna module 500 in FIG. 7) located inside the first housing 1810 (e.g., the first housing 310 in FIG. 3) and configured to radiate a main beam (not illustrated) toward the front surface 1810A. For example, the first surface 1821 (e.g., the first surface 801 in FIG. 7) of the antenna module 1820 may face the bezel area 1810D (e.g., in the z-axis direction), and the antenna array (e.g., the antenna array 810 in FIG. 7) located on the first surface 1821 or inside the antenna module 1820 close to the first surface 1821 may form a main beam toward the bezel area 1810D. The host device 1800 may include a first non-conductive portion (not illustrated) between the pen input device 1850 and the antenna module 1820. When viewed in the direction in which the main beam is radiated (e.g., the z-axis direction), the first non-conductive portion may overlap the antenna array of the antenna module 1820. The antenna module 1820 may be disposed to be spaced apart from the first non-conductive portion with an air gap interposed therebetween. The air gap may make it possible, for example, to reduce deformation or distortion of a beam pattern formed from the antenna module 1820 or to secure coverage (communication range) toward the front surface 1810A. The pen input device 1850 may include a second non-conductive portion 1851 (e.g., the second non-conductive portion 600 in FIG. 6) that at least partially overlaps the first non-conductive portion when viewed in the direction in which the main beam is radiated. When viewed in the direction in which the main beam is radiated, at least a portion of the antenna array of the antenna module 1820 may overlap the first non-conductive portion and the second non-conductive portion 1851. The main beam may travel through substantially the first non-conductive portion and the second non-conductive portion 1851. The radiation performance of the antenna module 1820 may be secured by substantially eliminating the conductive material disposed in the direction in which the main beam is radiated.

The pen input device 1850 may include at least one conductive member (e.g., the at least one conductive member 1400 in FIG. 14A or the at least one conductive member 1500 in FIG. 15) located to replace the non-conductive member 490 of FIG. 9 or coupled to the non-conductive member 490 of FIG. 9 or the second housing (e.g., the second housing 410 in FIG. 6) and located inside the pen input device 1850, as in the embodiment of FIG. 14A or FIG. 15. The at least one conductive member may act as a reflector, and may affect energy (or electromagnetic waves) radiated from the antenna module 1820 to change coverage. According to various embodiments of the disclosure, as in the embodiment of FIG. 14B, the pen input device 1850 may include a structure capable of moving at least one conductive member, and the coverage thereof may vary depending on the position of the at least one conductive member.

The pen input device 1850 may include a plurality of conductive portions (e.g., the plurality of conductive portions 1611, 1612, 1613, and 1614 in FIG. 16A) located to replace the non-conductive member 490 of FIG. 9 or coupled to the conductive member 490 of FIG. 9 or the second housing (e.g., the second housing 410 in FIG. 6) and located inside the pen input device 1850, as in the embodiment of FIG. 16A. The plurality of conductive portions may act as a director. The plurality of conductive portions may be electromagnetically coupled to an antenna array of the antenna module 1820 to operate as an antenna radiator.

Figure 19:
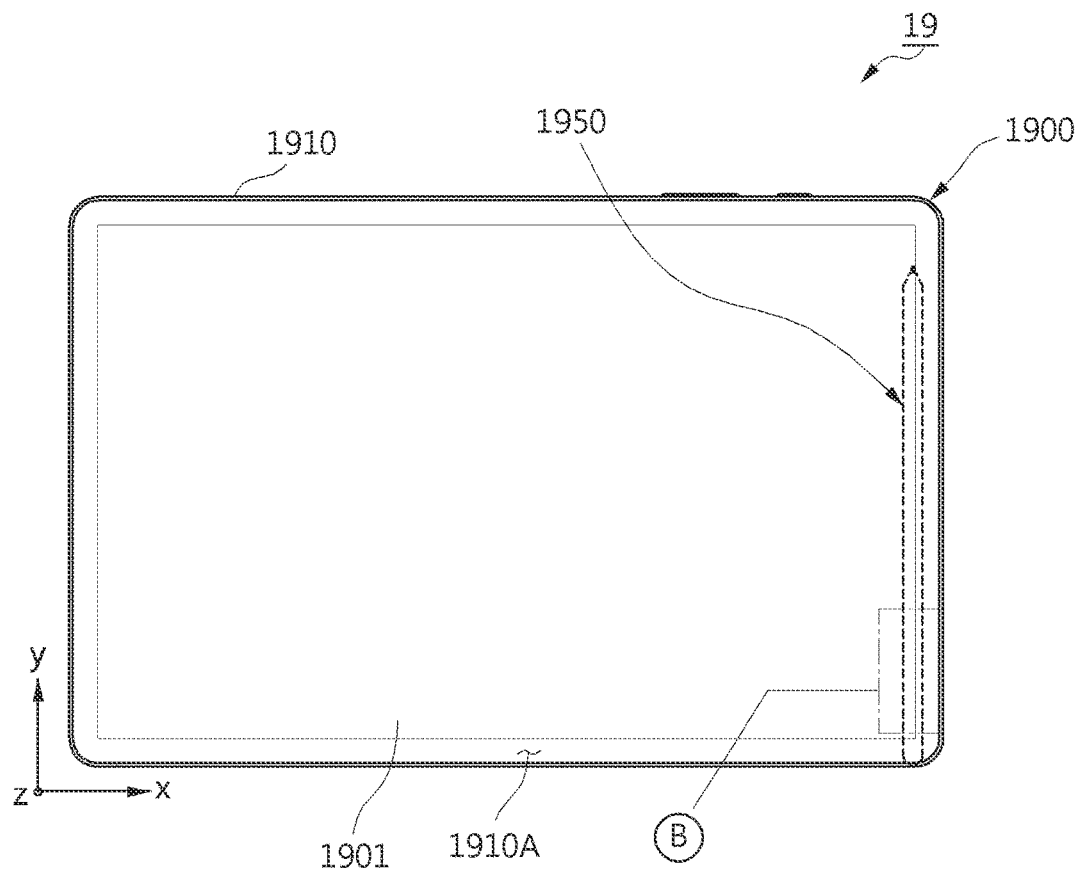
FIG. 19 is a plan view of an electronic device in a state in which a pen input device is attached to a host device according to an embodiment of the disclosure.
Figure 19:
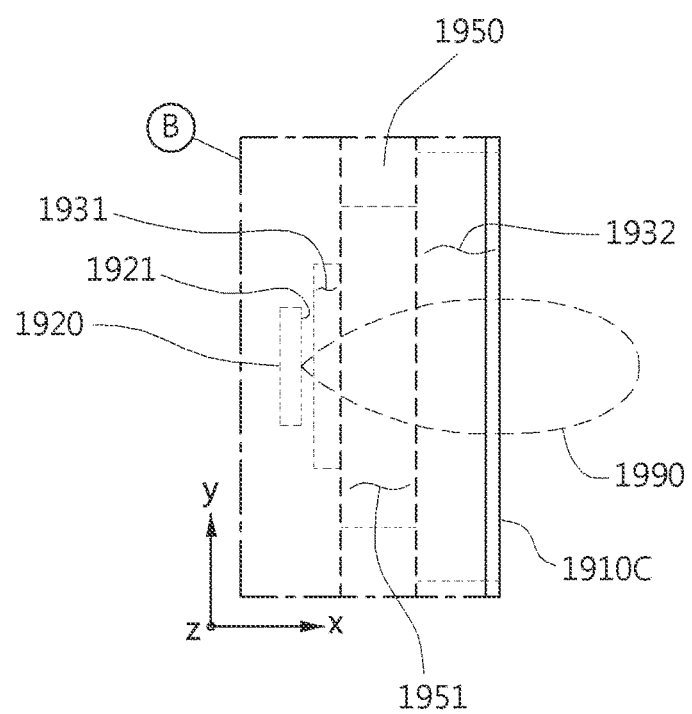

FIG. 19 is a plan view of an electronic device 19 in the state in which a pen input device 1950 is attached to a host device 1900 according to an embodiment of the disclosure.

Referring to FIG. 19, the host device 1900 may include a first housing 1910, and a display 1901 located inside the first housing 1910 and exposed through the front surface 1910A of the housing 1910. The pen input device 1950 may be inserted into the inside of the first housing 1910. At least one of the components of the electronic device 19 may be the same as or similar to at least one of the components of the electronic device 30 of FIG. 3 or FIG. 4, and a redundant description will be omitted below.

The host device 1900 may include an antenna module 1920 (e.g., the antenna module 500 in FIG. 7) located inside the first housing 1910 (e.g., the first housing 310 in FIG. 3) and configured to radiate a main beam 1990 toward a lateral surface 1910C. For example, the first surface 1921 (e.g., the first surface 801 in FIG. 7) of the antenna module 1920 may face the side surface 1910, and the antenna array (e.g., the antenna array 810 in FIG. 7) located on the first surface 1921 or inside the antenna module 1920 close to the first surface 1921 may form a main beam 1990 toward the side surface 1910C (e.g., in the +x-axis direction). The host device 1900 may include a first non-conductive portion 1931 between the pen input device 1950 and the antenna module 1920. When viewed in the direction in which the main beam 1990 is radiated, at least a portion of the first non-conductive portion 1931 may overlap the antenna array of the antenna module 1920. The antenna module 1920 may be disposed to be spaced apart from the first non-conductive portion 1931 with an air gap interposed therebetween. The air gap may make it possible, for example, to reduce deformation or distortion of a beam pattern formed from the antenna module 1920 or to secure coverage (communication range) toward the lateral surface 1910C. The pen input device 1950 may include a second non-conductive portion 1951 (e.g., the second non-conductive portion 600 in FIG. 6) that at least partially overlaps the first non-conductive portion 1931 when viewed in the direction in which the main beam 1990 is radiated (e.g., the +x axis direction). The host device 1900 may include a third non-conductive portion 1932 that overlaps the first non-conductive portion 1931 and the second non-conductive portion 1951 when viewed in the direction in which the main beam 1990 is radiated. The second non-conductive portion 1951 may be located between the first non-conductive portion 1931 and the third non-conductive portion 1932, and a portion of the lateral surface 1910C may be formed by the third non-conductive portion 1932. According to an embodiment of the disclosure, the first non-conductive portion 1931 may be omitted depending on the structure of the host device 1900. When viewed in the direction in which the main beam 1990 is radiated, at least a portion of the antenna array of the antenna module 1920 may overlap the first non-conductive portion 1931, the second non-conductive portion 1951, and the third non-conductive portion 1932. The main beam 1990 may travel through substantially the first non-conductive portion 1931, the second non-conductive portion 1951, and the third non-conductive portion 1932. The radiation performance of the antenna module 1920 may be secured by substantially eliminating the conductive material disposed in the direction in which the main beam 1990 is radiated.

The pen input device 1950 may include at least one conductive member located to replace the non-conductive member 490 of FIG. 9 or coupled to the non-conductive member 490 of FIG. 9 or the second housing (e.g., the second housing 410 in FIG. 6) and located inside the pen input device 1950, as in embodiment of FIG. 14A or FIG. 15. The at least one conductive member may act as a reflector, and may affect the electromagnetic waves radiated from the antenna module 1920 to change coverage. According to various embodiments of the disclosure, as in the embodiment of FIG. 14B, the pen input device 1950 may include a structure capable of moving at least one conductive member, and the coverage thereof may vary depending on the position of the at least one conductive member.

The pen input device 1950 may include a plurality of conductive portions (e.g., the plurality of conductive portions 1611, 1612, 1613, and 1614 in FIG. 16A, 16B, 16C, 16D, or 16E) located to replace the non-conductive member 490 of FIG. 9 or coupled to the non-conductive member 490 of FIG. 9 or the second housing (e.g., the second housing 410 in FIG. 6) and located inside the pen input device 1950, as in the embodiment of FIG. 16A. The plurality of conductive portions may act as a director. The plurality of conductive portions may be electromagnetically coupled to an antenna array of the antenna module 1920 to operate as an antenna radiator.

According to an embodiment of the disclosure, an electronic device (e.g., the electronic device 30 in FIG. 6) may include: a housing (e.g., the first housing 310 in FIG. 3) that includes a conductive portion (e.g., a conductive area 510 in FIG. 5); and a first non-conductive portion (e.g., the first non-conductive portion 540 in FIG. 6) connected to the conductive portion. The electronic device may include an antenna structure (e.g., the antenna structure 710 in FIG. 7) located inside the housing. The antenna structure may include a printed circuit board (e.g., the second printed circuit board 800 in FIG. 7) that includes a first surface (e.g., the first surface 801 in FIG. 7) and a second surface (e.g., the second surface 802 in FIG. 8) facing away from the first surface. The antenna structure 710 may include at least one antenna element (e.g., the plurality of antenna elements 811, 812, 813, and 814 in FIG. 7) located on the first surface or inside the printed circuit board to be closer to the first surface than the second surface. The electronic device may include a pen input device (e.g., the pen input device 400 in FIG. 6) detachably attached to the housing. The pen input device may include a second non-conductive portion (e.g., the second non-conductive portion 600 in FIG. 6), which at least partially overlaps the first non-conductive portion when viewed in a direction in which a main beam (e.g., the main beam 900 in FIG. 9) of the antenna structure is radiated in the state in which the pen input device is attached to the housing. When viewed in the direction in which the main beam of the antenna structure is radiated in the state in which the pen input device is attached to the housing, at least a portion of the at least one antenna element may overlap the first non-conductive portion and the second non-conductive portion.

According to an embodiment of the disclosure, the pen input device may include a tubular housing (e.g., the second housing 410 in FIG. 9) formed of a non-conductive material. The second non-conductive portion (e.g., the second non-conductive portion 600 in FIG. 9) may include: a partial section of the pen input device that overlaps the first non-conductive portion (e.g., the first non-conductive portion 540 in FIG. 5) and is included in the tubular housing or overlaps the first non-conductive portion and is connected to the tubular housing when viewed in the direction in which the main beam is radiated in the state in which the pen input device is attached to the housing; and a non-conductive member (e.g., the non-conductive member 490 in FIG. 9) located in the inner space of the partial section.

According to an embodiment of the disclosure, the non-conductive member (e.g., the non-conductive member 1200a in FIG. 12A, the non-conductive member 1200b in FIG. 12B, the non-conductive member 1200c in FIG. 12C, the non-conductive member 1200d in FIG. 12D, the non-conductive member 1200e in FIG. 12E, the non-conductive member 1300a in FIG. 13A, or the non-conductive member 1300b in FIG. 13B) may include a dielectric lens.

According to an embodiment of the disclosure, the pen input device (e.g., the pen input device 400 of FIG. 9) may include two magnetic bodies (e.g., the fourth magnetic body 461 and the fifth magnetic body 462 in FIG. 9) located inside the pen input device. The second non-conductive portion (e.g., the second non-conductive portion 600 in FIG. 9) may be located between the two magnetic bodies when viewed in the direction in which the main beam is radiated in the state in which the pen input device is attached to the housing.

According to an embodiment of the disclosure, the pen input device (e.g., the pen input device 400 in FIG. 9) may include an assembly accommodated in the tubular housing (e.g., the second housing 410 in FIG. 9). The assembly may include a pen tip sensor (e.g., the pen tip sensor 420 in FIG. 9) including a pen tip (e.g., the pen tip 421 of FIG. 9) and configured to generate a position signal and a pen pressure signal of the pen input device. The assembly may include a battery (e.g., the battery 470 in FIG. 9). The assembly may include a printed circuit board (e.g., the third printed circuit board 440 in FIG. 9) disposed between the pen tip sensor and the battery, wherein the printed circuit board may be electrically connected to the pen tip sensor and the battery. The second non-conductive portion (e.g., the second non-conductive portion 600 in FIG. 9) may be spaced apart from the assembly with the battery interposed therebetween.

According to an embodiment of the disclosure, the pen tip sensor (e.g., the pen tip sensor 420 in FIG. 9) may be configured an electro-magnetic resonance (EMR) type, an active electrical stylus (AES) type, or an electric coupled resonance (ECR) type.

According to an embodiment of the disclosure, the housing (e.g., the first housing 310 in FIG. 3) may include: a front plate (e.g., the front plate 302 in FIG. 3); a rear plate (e.g., the rear plate 311 in FIG. 3) disposed on the opposite side to the front plate; and a lateral member (e.g., the lateral member 318 in FIG. 3) that at least partially surrounds the space between the front plate and the rear plate. The electronic device (e.g., the host device 300 in FIG. 9) may further include a display (e.g., the display 301 in FIG. 9) located in the space and visually exposed through the front plate.

According to an embodiment of the disclosure, the pen input device (e.g., the pen input device 400 in FIG. 6) may be detachably attached to the rear plate (e.g., the rear plate 311 in FIG. 6).

According to an embodiment of the disclosure, the pen input device (e.g., the pen input device 1850 in FIG. 18) may be detachably attached to the front plate not to overlap the display (e.g., the display 1801 in FIG. 18) when viewed from above the front plate.

According to an embodiment of the disclosure, the pen input device (e.g., the pen input device 1750 in FIG. 17) may be detachably attached to the lateral member.

According to an embodiment of the disclosure, the electronic device (e.g., the electronic device 30 in FIG. 3) may further include a radio communication circuit (e.g., the radio communication circuit 720 in FIG. 8) disposed on the second surface (e.g., the second surface in FIG. 7). The radio communication circuit may be electrically connected to the at least one antenna element (e.g., the plurality of antenna elements 811, 812, 813, and 814 in FIG. 7) and may be configured to transmit and/or transmit a signal of a selected or predetermined frequency band.

According to an embodiment of the disclosure, the radio communication circuit (e.g., the radio communication circuit 720 in FIG. 8) may be configured to transmit and/or receive a signal of at least a partial frequency band of 3 GHz to 100 GHz via the at least one antenna element (e.g., the plurality of antenna elements 811, 812, 813, and 814 in FIG. 7).

According to an embodiment of the disclosure, the at least one antenna element may include a first antenna element and a second antenna element, wherein the first antenna element and the second antenna element may constitute an antenna array (e.g., the antenna array 810 in FIG. 7).

According to an embodiment of the disclosure, the pen input device (e.g., the pen input device 400 in FIG. 14A, 15, or 16A) may include at least one conductive portion (e.g., the at least one conductive member 1400 in FIG. 14A, the at least one conductive member 1500 in FIG. 15, or the plurality of conductive portions 1611, 1612, 1613, and 1614 in FIG. 16A), which is coupled to the second non-conductive portion (e.g., the second non-conductive portion 600 in FIG. 9) and located inside the pen input device. The at least one conductive portion may overlap the at least one antenna element (e.g., the plurality of antenna elements 811, 812, 813, and 814 in FIG. 7) when viewed in the direction in which the main beam is radiated in the state in which the pen input device is attached to the housing.

According to an embodiment of the disclosure, the pen input device (e.g., the pen input device 400 in FIG. 14B) may include a rotation device (e.g., the rotation device 1402 in FIG. 14B), which is located inside the pen input device and connected to the at least one conductive portion (e.g., the at least one conductive member 1400 in FIG. 14B) to move the position of the at least one conductive portion.

According to various embodiments of the disclosure, the electronic device (e.g., the electronic device 30 in FIG. 9) may include a housing (e.g., the first housing 310 in FIG. 3) and an antenna structure (e.g., the antenna structure 710 in FIG. 7) located inside the housing. The antenna structure may include a printed circuit board (e.g., the second printed circuit board 800 in FIG. 7) that includes a first surface (e.g., the first surface 801 in FIG. 7) and a second surface (e.g., the second surface 802 in FIG. 8) facing away from the first surface. The antenna structure may include at least one antenna element (e.g., the plurality of antenna elements 811, 812, 813, and 814 in FIG. 7) located on the first surface or inside the printed circuit board to be closer to the first surface than the second surface. The electronic device may include a pen input device (e.g., the pen input device 400 in FIG. 9) detachably attached to the housing. The pen input device may include a non-conductive section (e.g., the first section 401 in FIG. 9) which overlaps the at least one antenna element in the state in which the pen input device is attached to the housing.

According to various embodiments of the disclosure, the housing (e.g., the rear plate 311 in FIG. 9) may include a conductive portion (e.g., the conductive area 510 in FIG. 4) and a non-conductive portion (e.g., the first non-conductive area 540 in FIG. 4 or FIG. 9) connected to the conductive portion. When viewed in the direction in which the main beam (e.g., the main beam 900 in FIG. 9) of the antenna structure (e.g., the antenna structure 710 in FIG. 7) is radiated in the state in which the pen input device is attached to the housing, the at least one antenna element (e.g., the plurality of antenna elements 811, 812, 813, and 814 in FIG. 7) may overlap the non-conductive portion and the non-conductive portion.

According to various embodiments of the disclosure, the pen input device (e.g., the pen input device 400 in FIG. 9) may include a tubular housing (e.g., the second housing 410 in FIG. 9) formed of a non-conductive material. The pen input device may include an assembly accommodated in the tubular housing. The assembly may include a pen tip sensor (e.g., the pen tip sensor 420 in FIG. 9) including a pen tip (e.g., the pen tip 421 in FIG. 9) and configured to generate a position signal and a pen pressure signal of the pen input device. The pen input device may include a battery (e.g., the battery 470 in FIG. 9). The pen input device may include a printed circuit board (e.g., the third printed circuit board 440 in FIG. 8) disposed between the pen tip sensor and the battery. The printed circuit board may be electrically connected to the pen tip sensor and the battery. The non-conductive section (e.g., the first section 401 in FIG. 9) may be spaced apart from the assembly with the battery interposed therebetween.

According to various embodiments of the disclosure, the pen input device (e.g., the pen input device 400 in FIG. 9) may include two material materials (e.g., the fourth magnetic body 461 and the fifth magnetic body 462 in FIG. 9) located inside the tubular housing (e.g., the second housing 410 in FIG. 9). The non-conductive section (e.g., the first portion 401 in FIG. 9) may be located between the two magnetic bodies when viewed in the direction in which the main beam (e.g., the main beam 900 in FIG. 9) is radiated in the state in which the pen input device is attached to the housing (e.g., the rear plate 311 in FIG. 9).

According to various embodiments of the disclosure, the electronic device (e.g., the electronic device 30 in FIG. 3) may further include a radio communication circuit (e.g., the radio communication circuit 720 in FIG. 8) disposed on the second surface (e.g., the second surface 802 in FIG. 7). The radio communication circuit may be electrically connected to the at least one antenna element (e.g., the plurality of antenna elements 811, 812, 813, and 814 in FIG. 7) and may be configured to transmit and/or transmit a signal of a selected or predetermined frequency band.

According to various embodiments of the disclosure, the selected or predetermined frequency band may include 3 GHz to 100 GHz.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing comprising a conductive portion and a first non-conductive portion connected to the conductive portion;
   an antenna structure located inside the housing, the antenna structure comprising:
   a printed circuit board comprising a first surface and a second surface facing away from the first surface, and
   at least one antenna element located on the first surface or inside the printed circuit board to be closer to the first surface than the second surface; and
   a pen input device detachable from the housing,
   wherein the pen input device comprises a second non-conductive portion at least partially overlapping the first non-conductive portion when viewed in a direction in which a main beam of the antenna structure is radiated while the pen input device is attached to the housing, and
   wherein at least a portion of the at least one antenna element overlaps the first non-conductive portion and the second non-conductive portion.

2. The electronic device of claim 1,
   wherein the pen input device comprises a tubular housing formed of a non-conductive material, and
   wherein the second non-conductive portion comprises:
   a partial section of the pen input device that overlaps the first non-conductive portion and is included in the tubular housing or overlaps the first non-conductive portion and is connected to the tubular housing when viewed in the direction in which the main beam is radiated while the pen input device is attached to the housing, and
   a non-conductive member located in an inner space of the partial section.

3. The electronic device of claim 2, wherein the non-conductive member comprises a dielectric lens.

4. The electronic device of claim 2,
   wherein the pen input device comprises two magnetic bodies located inside the pen input device, and
   wherein the second non-conductive portion is located between the two magnetic bodies when viewed in the direction in which the main beam is radiated while the pen input device is attached to the housing.

5. The electronic device of claim 2,
wherein the pen input device comprises an assembly accommodated in the tubular housing,
wherein the assembly comprises:
- a pen tip sensor comprising a pen tip and configured to generate a position signal and a pen pressure signal of the pen input device,
- a battery, and
- a printed circuit board disposed between the pen tip sensor and the battery and electrically connected to the pen tip sensor and the battery, and wherein the second non-conductive portion is spaced apart from the assembly with the battery interposed therebetween.

6. The electronic device of claim 5, wherein the pen tip sensor is configured in an electro-magnetic resonance (EMR) type, an active electrical stylus (AES) type, or an electric coupled resonance (ECR) type.

7. The electronic device of claim 1,
wherein the housing comprises:
- a front plate,
- a rear plate disposed on an opposite side to the front plate, and
- a lateral member that at least partially surrounds a space between the front plate and the rear plate, and wherein the electronic device further comprises a display located in the space and visually exposed through the front plate.

8. The electronic device of claim 7, wherein the pen input device is configured to be detachably attached to the rear plate.

9. The electronic device of claim 7, wherein the pen input device is configured to be detachably attached to the front plate not to overlap the display when viewed from above the front plate.

10. The electronic device of claim 7, wherein the pen input device is configured to be detachably attached to the lateral member.

11. The electronic device of claim 1, further comprising:
a radio communication circuit disposed on the second surface,
wherein the radio communication circuit is electrically connected to the at least one antenna element and is configured to transmit and/or receive a signal in a selected or predetermined frequency band.

12. The electronic device of claim 11, wherein the radio communication circuit is configured to transmit and/or receive a signal of at least a partial frequency band from 3 GHz to 100 GHz via the at least one antenna element.

13. The electronic device of claim 1,
wherein the at least one antenna element comprises a first antenna element and a second antenna element, and
wherein the first antenna element and the second antenna element constitutes an antenna array.

14. The electronic device of claim 1,
wherein the pen input device further comprises at least one conductive portion coupled to the second non-conductive portion and located inside the pen input device; and
wherein the at least one conductive portion overlaps the at least one antenna element when viewed in the direction in which the main beam is radiated while the pen input device is attached to the housing.

15. The electronic device of claim 14, wherein the pen input device further comprises a rotation device located inside the pen input device and connected to the at least one conductive portion to move a position of the at least one conductive portion.

16. The electronic device of claim 1, wherein the antenna structure is spaced apart from the first non-conductive portion so as to form an air gap therebetween.

17. The electronic device of claim 1, wherein the second non-conductive portion is formed in one of a bar or a cross shape.

18. The electronic device of claim 2, wherein the pen input device further comprises a plurality of conductive members arranged within the tubular housing and corresponding to a number of antenna elements.

* * * * *